US011099737B2

(12) United States Patent
Abe et al.

(10) Patent No.: US 11,099,737 B2
(45) Date of Patent: *Aug. 24, 2021

(54) FAST LOCATE USING IMITATION READS ON TAPE DRIVES

(71) Applicant: International Business Machines Corporation, Armonk, NY (US)

(72) Inventors: Atsushi Abe, Ebina (JP); Setsuko Masuda, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/512,225

(22) Filed: Jul. 15, 2019

(65) Prior Publication Data

US 2019/0339877 A1 Nov. 7, 2019

Related U.S. Application Data

(63) Continuation of application No. 15/824,410, filed on Nov. 28, 2017, now Pat. No. 10,423,336.

(51) Int. Cl.
*G06F 3/06* (2006.01)
*G06F 12/0868* (2016.01)
*G06F 12/0846* (2016.01)

(52) U.S. Cl.
CPC ............ *G06F 3/0611* (2013.01); *G06F 3/065* (2013.01); *G06F 3/0619* (2013.01);
(Continued)

(58) Field of Classification Search
CPC ...... G06F 3/0611; G06F 3/0619; G06F 3/065; G06F 3/0676; G06F 12/0848; F06F 3/0659

(Continued)

(56) References Cited

U.S. PATENT DOCUMENTS 6,665,137 B2 12/2003 Zweighaft et al.
7,231,496 B2 6/2007 Curtis
(Continued)

FOREIGN PATENT DOCUMENTS

CN 101149668 A 3/2008
CN 102662859 A 9/2012
(Continued)

OTHER PUBLICATIONS

R. H. Katz, "High-performance network and channel-based storage," In Proceedings of the IEEE, vol. 80, No. 8, pp. 1238-1261, Aug. 1992, doi: 10.1109/5.158597.*
"Cache Control In A Non-Volatile Memory Device", An IP.com Prior Art Database Technical Disclosure, IP.com No. IPCOM000147008D, Mar. 4, 2007.*
G. T. Kishi, "The IBM Virtual Tape Server: Making tape controllers more autonomic," in IBM Journal of Research and Development, vol. 47, No. 4, pp. 459-469, Jul. 2003.*
(Continued)

*Primary Examiner* — Pierre Miche Bataille
(74) *Attorney, Agent, or Firm* — Zilka-Kotab, P.C.

(57) ABSTRACT

A computer-implemented method, according to one embodiment, includes: receiving a read request for data stored on a magnetic tape, the data having multiple portions. For each portion of the requested data determined as not being located in a cache, a determination is made as to whether performing a locate command or performing a read command a plurality of times will retrieve the portions of the requested data that are not located in the cache in a shorter amount of time. The command determined to retrieve the portions of the requested data that are not located in the cache in the shorter amount of time are issued to a tape drive. Moreover, the portions of the requested data that are not located in the cache are combined with portions of the requested data that are located in the cache. Furthermore, the combined portions are used to satisfy the read request.

18 Claims, 19 Drawing Sheets

(52) U.S. Cl.
CPC .......... *G06F 3/0659* (2013.01); *G06F 3/0676* (2013.01); *G06F 12/0848* (2013.01); *G06F 12/0868* (2013.01); *G06F 2212/282* (2013.01)

(58) Field of Classification Search
USPC ........................................................ 711/113
See application file for complete search history.

(56) References Cited

U.S. PATENT DOCUMENTS

| | | | |
|---|---|---|---|
| 7,864,479 B2 | 1/2011 | Ashton et al. | |
| 8,139,311 B2 | 3/2012 | Oishi | |
| 9,513,818 B2 | 12/2016 | Whitney | |
| 9,830,236 B2 | 11/2017 | Antony | |
| 10,242,709 B1 | 3/2019 | Yamamoto et al. | |
| 10,423,336 B2 | 9/2019 | Abe et al. | |
| 2003/0040214 A1* | 2/2003 | Kiely | H01R 9/2475 439/491 |
| 2003/0041214 A1* | 2/2003 | Hirao | G06F 12/0862 711/137 |
| 2003/0115409 A1* | 6/2003 | Yamada | G06F 3/0613 711/113 |
| 2003/0149837 A1* | 8/2003 | Coker | G06F 3/0601 711/113 |
| 2004/0148458 A1* | 7/2004 | Sekine | G06F 3/061 711/111 |
| 2007/0233757 A1* | 10/2007 | Inai | G06F 3/061 |
| 2012/0254547 A1 | 10/2012 | Benhase et al. | |
| 2014/0189232 A1* | 7/2014 | Enohara | G06F 3/0686 711/111 |
| 2016/0041758 A1 | 2/2016 | Iwasaki et al. | |
| 2017/0153833 A1* | 6/2017 | Iwasaki | G06F 3/0665 |
| 2017/0185619 A1 | 6/2017 | Choubey et al. | |
| 2019/0163376 A1 | 5/2019 | Abe et al. | |
| 2019/0339878 A1 | 11/2019 | Abe et al. | |
| 2019/0339879 A1 | 11/2019 | Abe et al. | |

FOREIGN PATENT DOCUMENTS

| | | |
|---|---|---|
| CN | 106991059 A | 7/2017 |
| DE | 112012005271 T5 | 11/2014 |
| EP | 0482297 B1 | 4/1998 |
| WO | 0042519 A8 | 10/2000 |

OTHER PUBLICATIONS

Schwank et al., "Transparent handling of small files with dCache to optimize tape access," 21st International Conference on Computing in High Energy and Nuclear Physics, Journal of Physics: Conference Series, vol. 664, 2015, pp. 1-4.

VERITAS Technologies, "About fast-tape positioning (locate-block) on Solaris," VERITAS support, Article ID: 000119423, Dec. 5, 2016, pp. 1-2.

Abe et al., U.S. Appl. No. 15/824,410, filed Nov. 28, 2017.

Non-Final Office Action from U.S. Appl. No. 15/824,410, dated Feb. 7, 2019.

International Search Report and Written Opinion from PCT Application No. PCT/IB2018/058688, dated Feb. 20, 2019.

Notice of Allowance from U.S. Appl. No. 15/824,410, dated May 15, 2019.

Abe et al., U.S. Appl. No. 16/512,232, filed Jul. 15, 2019.

Abe et al., U.S. Appl. No. 16/512,237, filed Jul. 15, 2019.

List of IBM Patents Or Patent Applications Treated As Related.

Office Action from German Patent Application No. 11 2018 005 316.4, dated Oct. 14, 2020.

Non-Final Office Action from U.S. Appl. No. 16/512,232, dated Sep. 3, 2020.

Banning et al., "Optimizing the Use of a Disk Cache," IP.com Prior Art Database, Technical Disclosure No. IPCOM000056781D, Feb. 1, 1988, 2 pages.

Non-Final Office Action from U.S. Appl. No. 16/512,237, dated Sep. 4, 2020.

Final Office Action from U.S. Appl. No. 16/512,232, dated Feb. 16, 2021.

Final Office Action from U.S. Appl. No. 16/512,237, dated Feb. 16, 2021.

Notice of Allowance from U.S. Appl. No. 16/512,232, dated Apr. 14, 2021.

Notice of Allowance from U.S. Appl. No. 16/512,237, dated Apr. 27, 2021.

Corrected Notice of Allowance from U.S. Appl. No. 16/512,232, dated May 26, 2021.

Supplemental Notice of Allowance from U.S. Appl. No. 16/512,237, dated May 21, 2021.

* cited by examiner

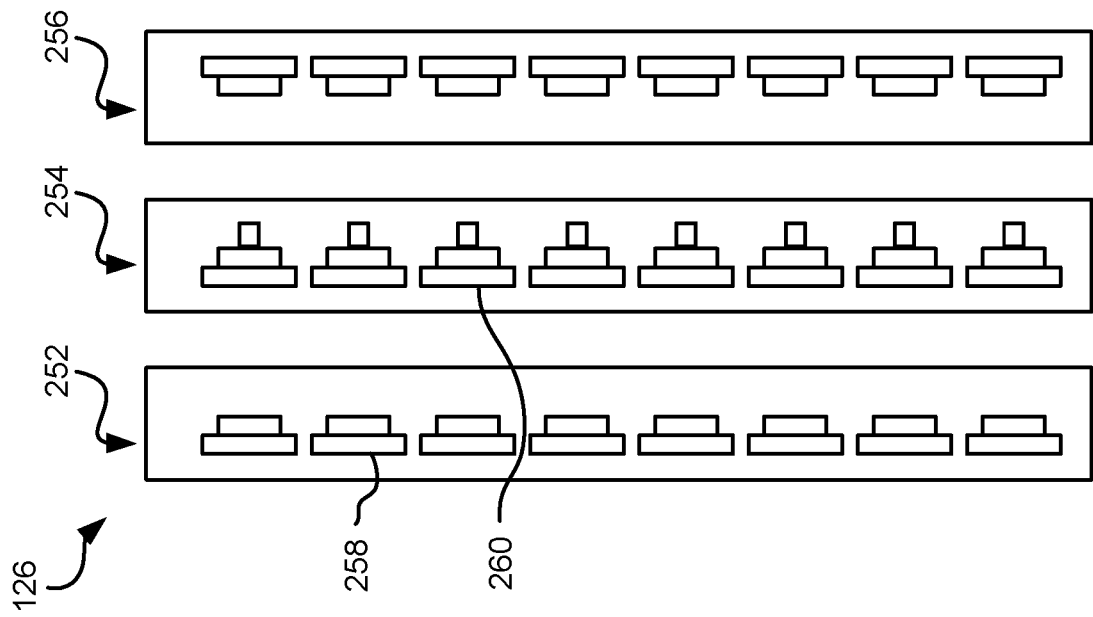
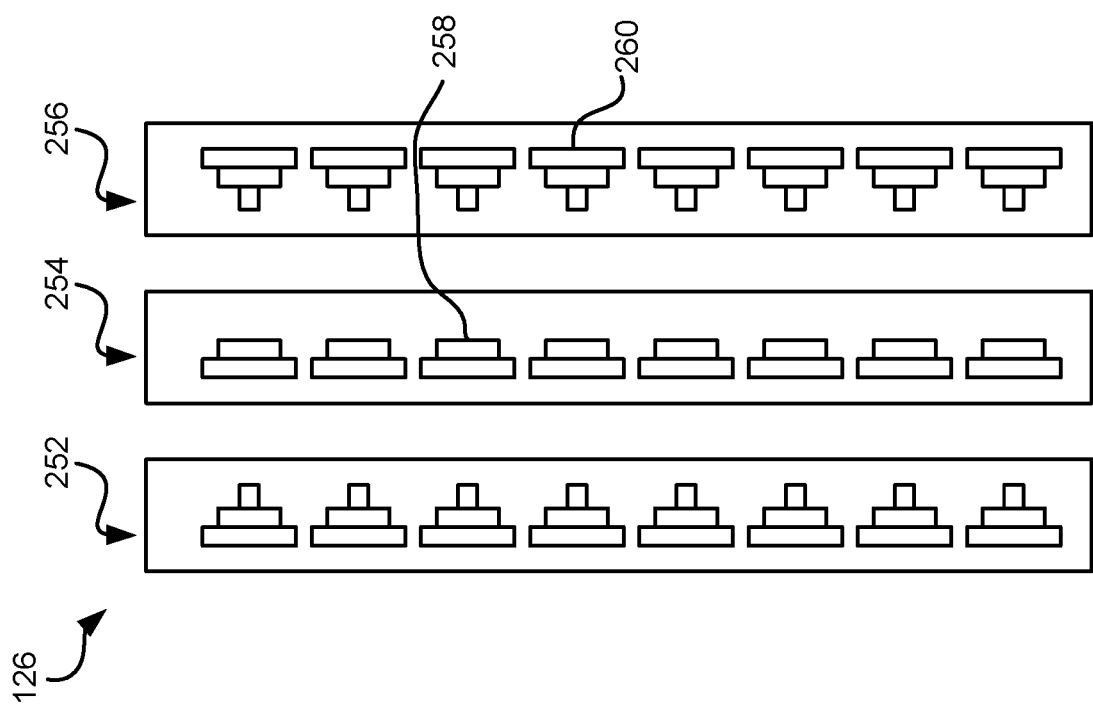

FAST LOCATE USING IMITATION READS ON TAPE DRIVES

BACKGROUND

The present invention relates to data storage systems, and more particularly, this invention relates to reading located data using tape drives.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

Accessing data previously written to a magnetic tape typically involves locating the magnetic tape on which the data was written, retrieving the magnetic tape, loading the magnetic tape into a tape drive, aligning a magnetic head in the tape drive with the particular portion of the magnetic tape where the data is written, and actually reading the data. Attempts to reduce data access times have introduced the use of caching in combination with magnetic tape. As data is written to and/or read from magnetic tape, data is temporarily stored in a cache such that it is more easily and quickly accessible. However, as the amount of available space in the cache decreases during use, the data stored in the cache is flushed, thereby freeing the cache to store other data. Accordingly, when writing a particular file that has a size which is larger than the size of the cache, only a portion of the file remains in the cache at any point in time, thereby causing the file to be allocated to memory in discontinuous regions.

SUMMARY

A computer-implemented method, according to one embodiment, includes: receiving a read request for data stored on a magnetic tape, the data having multiple portions. For each of the portions of the requested data determined as not being located in a cache, a determination is made as to whether performing a locate command or performing a read command a plurality of times will retrieve the portions of the requested data that are not located in the cache in a shorter amount of time. The command determined to retrieve the portions of the requested data that are not located in the cache in the shorter amount of time are issued to a tape drive. Moreover, the portions of the requested data that are not located in the cache are combined with portions of the requested data that are located in the cache. Furthermore, the combined portions are used to satisfy the read request.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
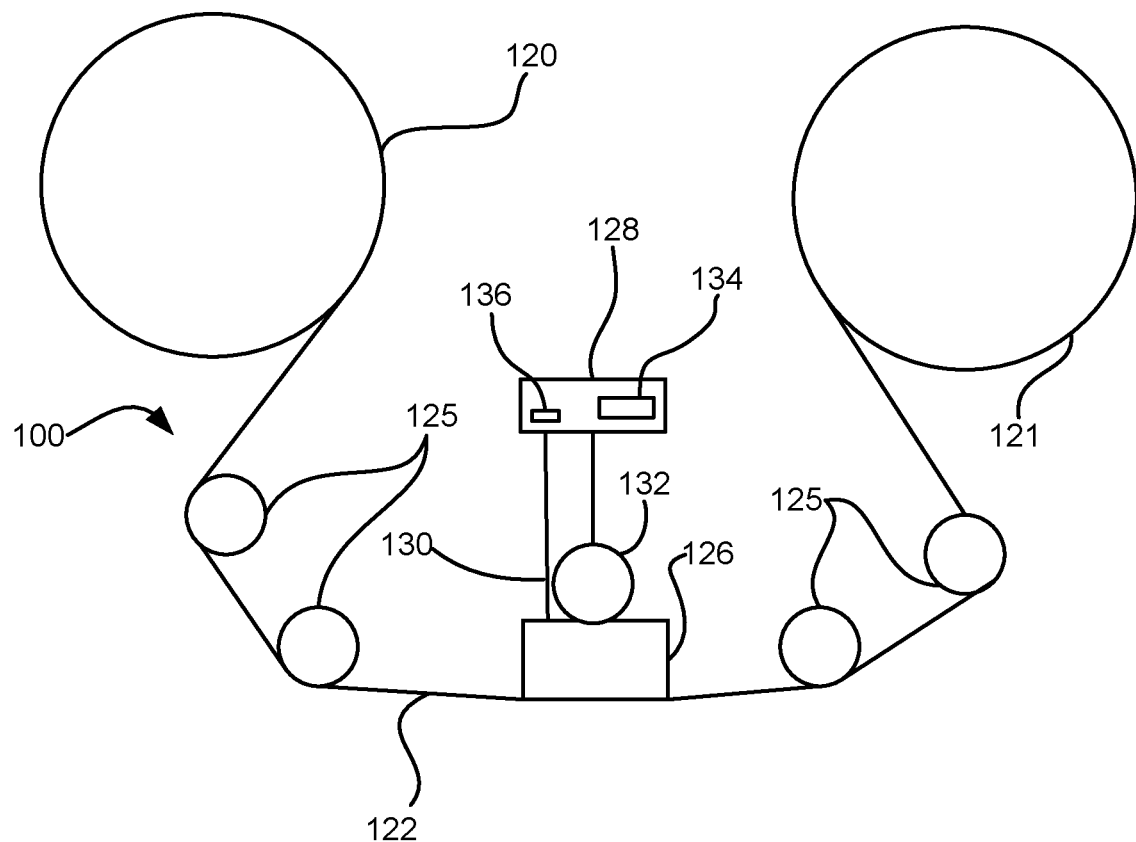
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various ones of the embodiments described herein are able to improve performance of read requests by determining a most advantageous method of arriving at the record and/or reading the record itself, thereby improving system performance based on current (e.g., specific) system parameters, decreasing read access times, reducing wear on a tape drive, etc., as will be described in further detail below.

In one general embodiment, a computer-implemented method includes: receiving a read request for data stored on a magnetic tape, the data comprising multiple portions, determining whether a copy of a portion of the requested data is located in a cache, instructing a tape drive to access, on the magnetic tape, portions of the requested data determined to not be located in the cache, for each of the portions of the requested data that are not located in the cache, determine whether performing a locate command or performing a read command a plurality of times will retrieve the portions of the requested data that are not located in the cache in a shorter amount of time, issuing the command determined to retrieve the portions of the requested data that are not located in the cache in the shorter amount of time, combining the portions of the requested data that are not located in the cache with the portion of the requested data located in the cache, and satisfying the read request.

In another general embodiment, a computer-implemented method includes: receiving a read request for data stored on a magnetic tape, the data comprising multiple portions, instructing a tape drive to access the requested data on the magnetic tape, and for each portion of the requested data, performing an iterative process of: instructing the tape drive to read the portion of the requested data from the magnetic tape, determining whether a copy of the portion of the requested data is located in a cache, instructing the tape drive to discard the portion of the requested data read from the magnetic tape in response to determining that a copy of the portion of the requested data is located in the cache, and receiving, from the tape drive, the portion of the requested data read from the magnetic tape in response to determining that a copy of the portion of the requested data is not located in the cache.

In another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: receiving, by the processor, a read request for data stored on a magnetic tape, the data comprising multiple portions; instructing, by the processor, a tape drive to access the requested data on the magnetic tape; and for each portion of the requested data, performing, by the processor, an iterative process of: instructing the tape drive to read the portion of the requested data from the magnetic tape; determining whether a copy of the portion of the requested data is located in a cache; instructing the tape drive to discard the portion of the requested data read from the magnetic tape in response to determining that a copy of the portion of the requested data is located in the cache; and receiving, from the tape drive, the portion of the requested data read from the magnetic tape in response to determining that a copy of the portion of the requested data is not located in the cache.

In yet another general embodiment, a computer-implemented method includes: receiving a read request for data stored on a magnetic tape, determining whether a first amount of time associated with performing a locate operation to advance the magnetic tape from a second position to a first position is less than a second amount of time associated with performing a number of read operations to advance the magnetic tape from the second position to the first position, instructing the tape drive to perform the locate operation in response to determining that the first amount of time is less than the second amount of time, instructing the tape drive to perform the number of read operations in response to determining that the first amount of time is not less than the second amount of time, and instructing the tape drive to discard the data read from the magnetic tape while performing the number of read operations. It should be noted that, according to the present description, the "second position" is intended to correspond to a current location of a magnetic tape head relative to the magnetic tape, and the "first position" is intended to correspond to a beginning of the requested data.

In another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: receiving, by the processor, a read request for data stored on a magnetic tape; determining, by the processor, whether a first amount of time associated with performing a locate operation to advance the magnetic tape from a second position to a first position is less than a second amount of time associated with performing a number of read operations to advance the magnetic tape from the second position to the first position; instructing, by the processor, the tape drive to perform the locate operation in response to determining that the first amount of time is less than the second amount of time; instructing, by the processor, the tape drive to perform the number of read operations in response to determining that the first amount of time is not less than the second amount of time; and instructing, by the processor, the tape drive to discard the data read from the magnetic tape while performing the number of read operations. It should again be noted that, according to the present description, the "second position" is intended to correspond to a current location of a magnetic tape head relative to the magnetic tape, while the "first position" is intended to correspond to a beginning of the requested data.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
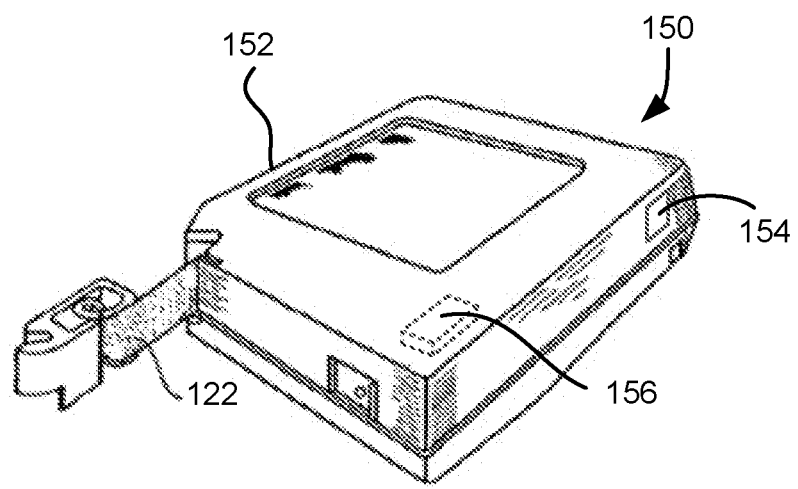
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150.

The nonvolatile memory is accessible by the tape drive and the tape operating software (the driver software), and/or another device.

Figure 2A:
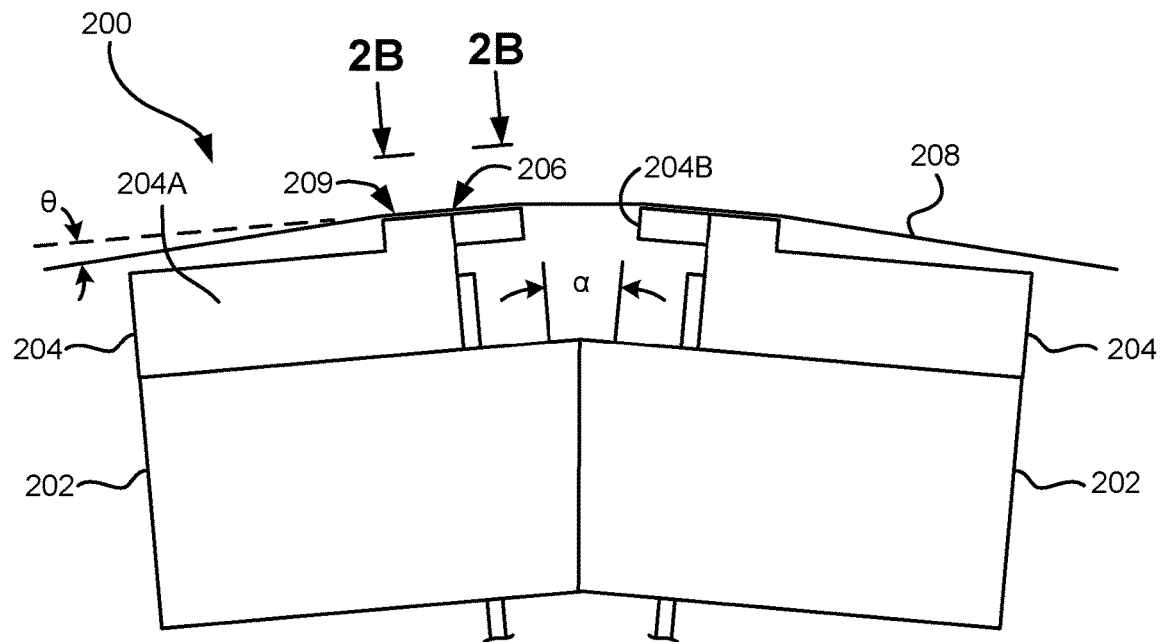
FIG. 2A is a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
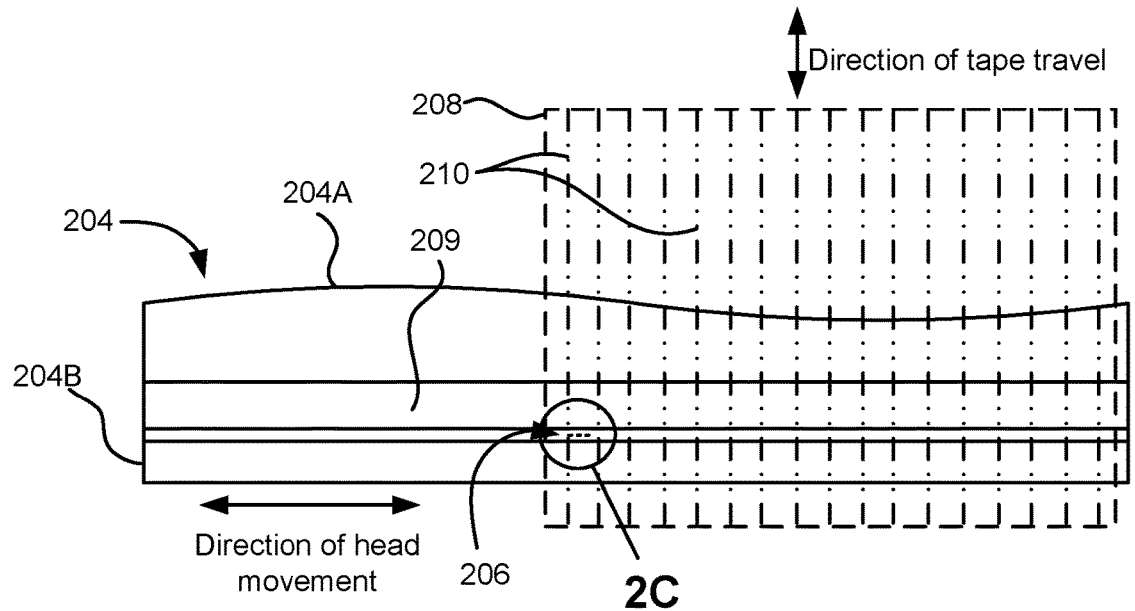
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
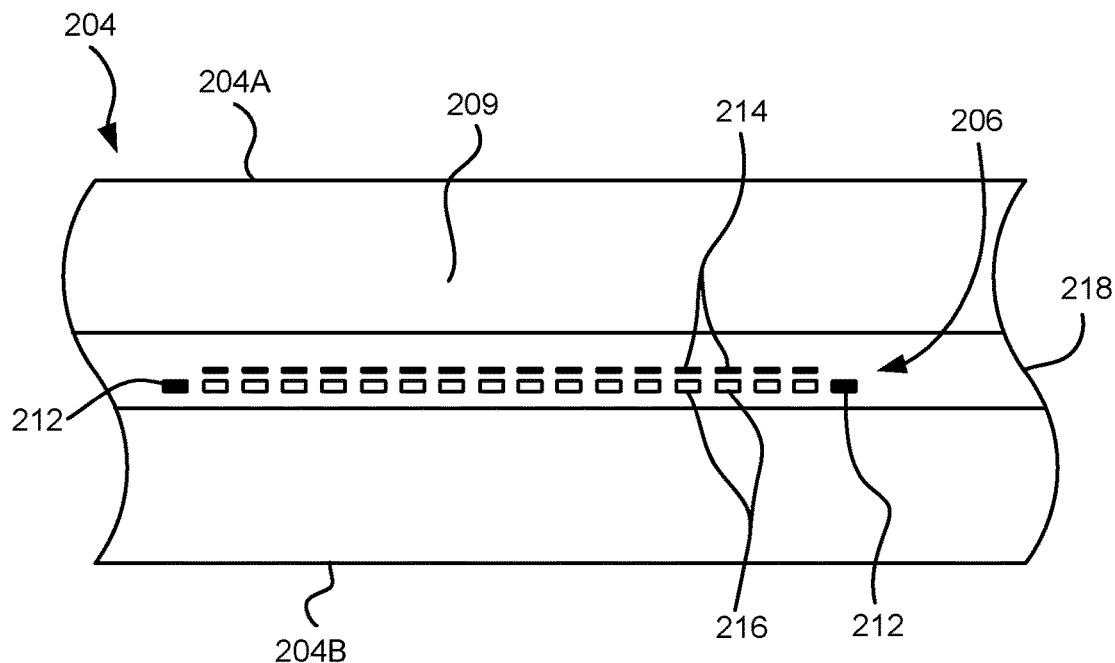
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
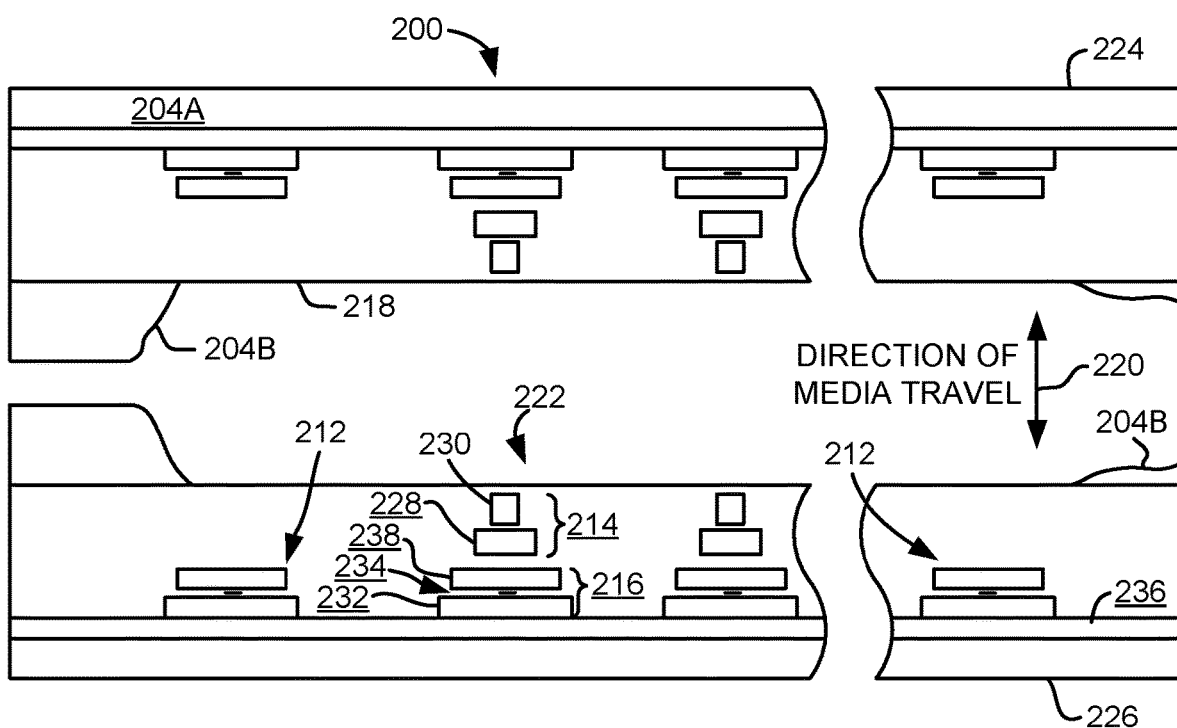
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
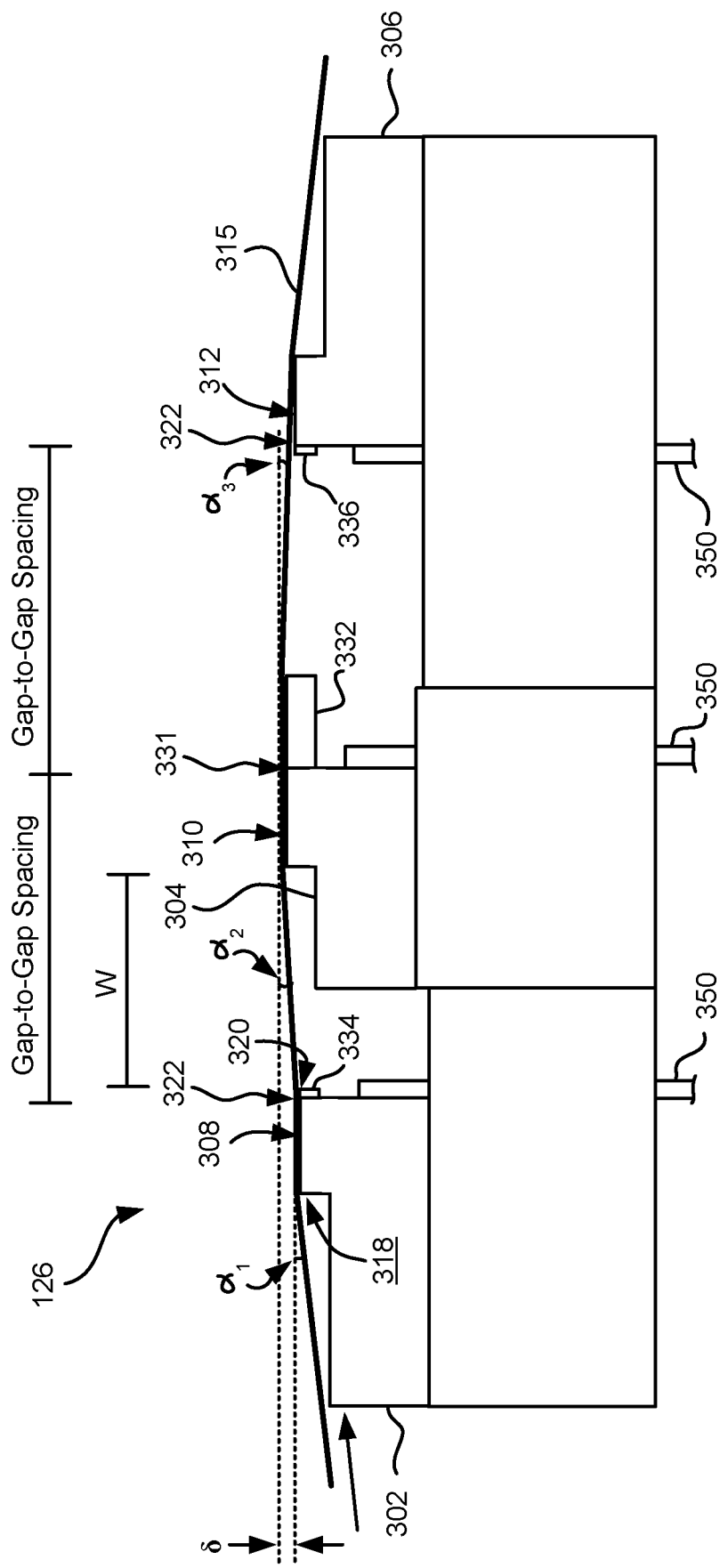
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
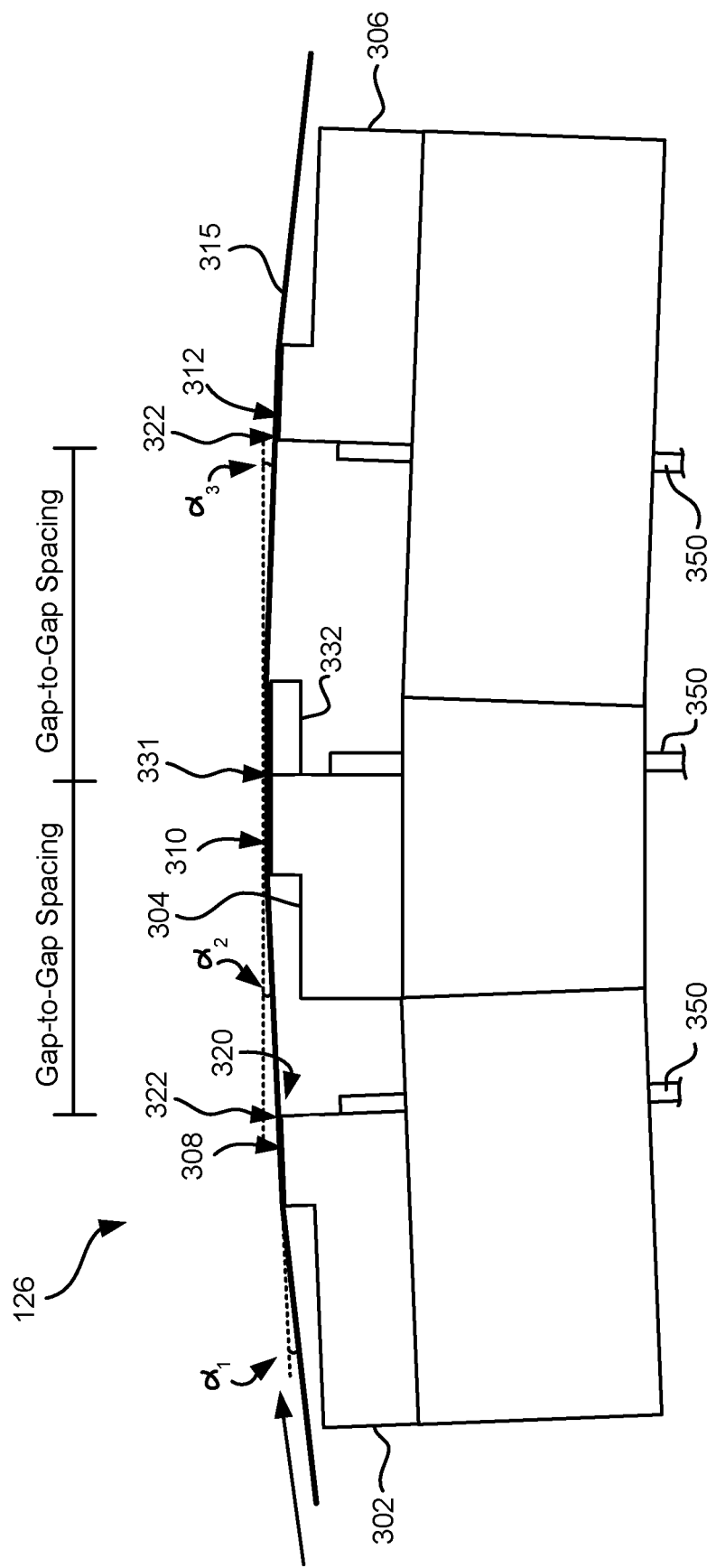
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha 3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
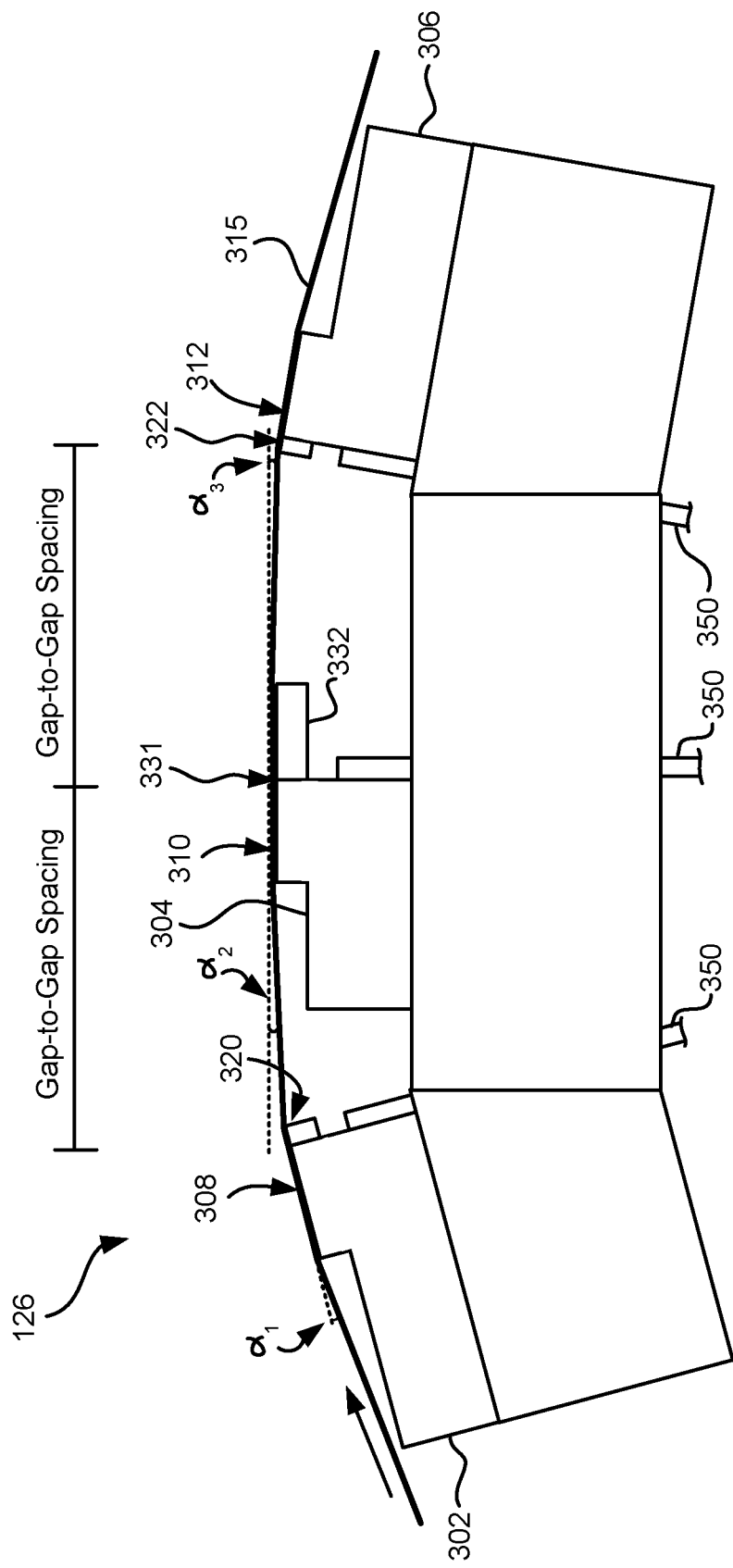
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
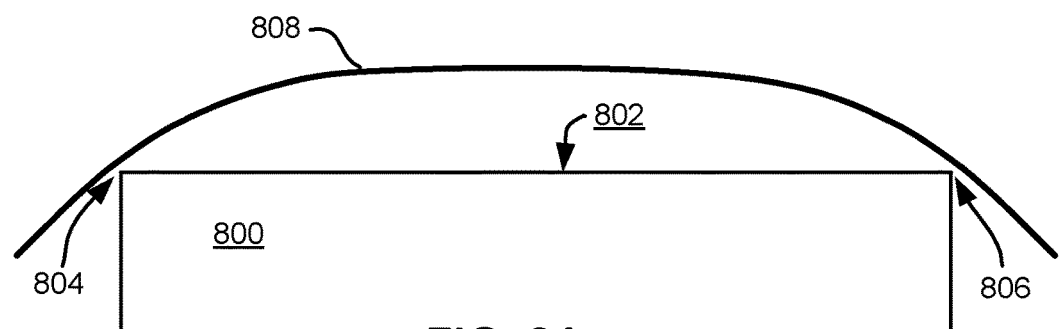
FIGS. 8A-8C are schematics depicting the principles of tape tenting.
Figure 8B:
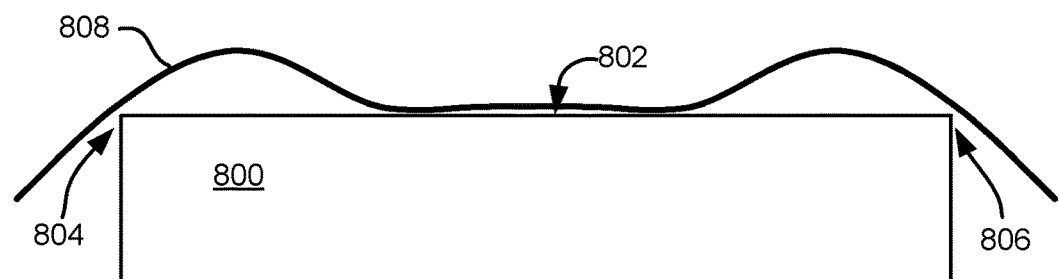
Figure 8C:
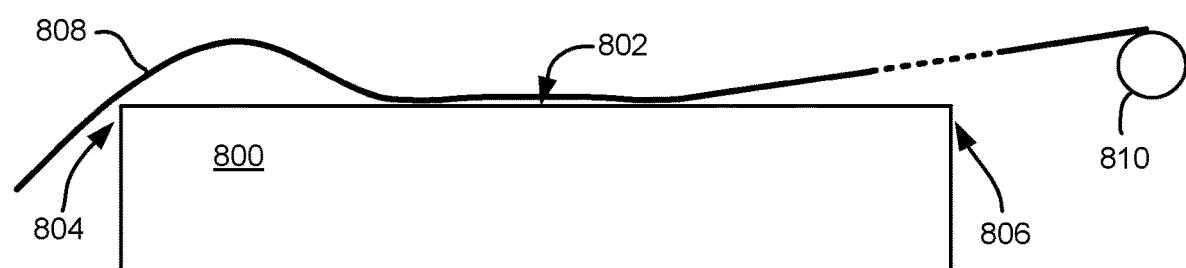

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic tape head of a tape drive. Furthermore, the tape may be attached on a take-up reel (e.g., see 121 of FIG. 1A above) to move the tape over the magnetic tape head.

Once threaded in the tape drive, the tape in the cartridge may be "mounted" by reading metadata on a tape (e.g., such as in an Index) and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
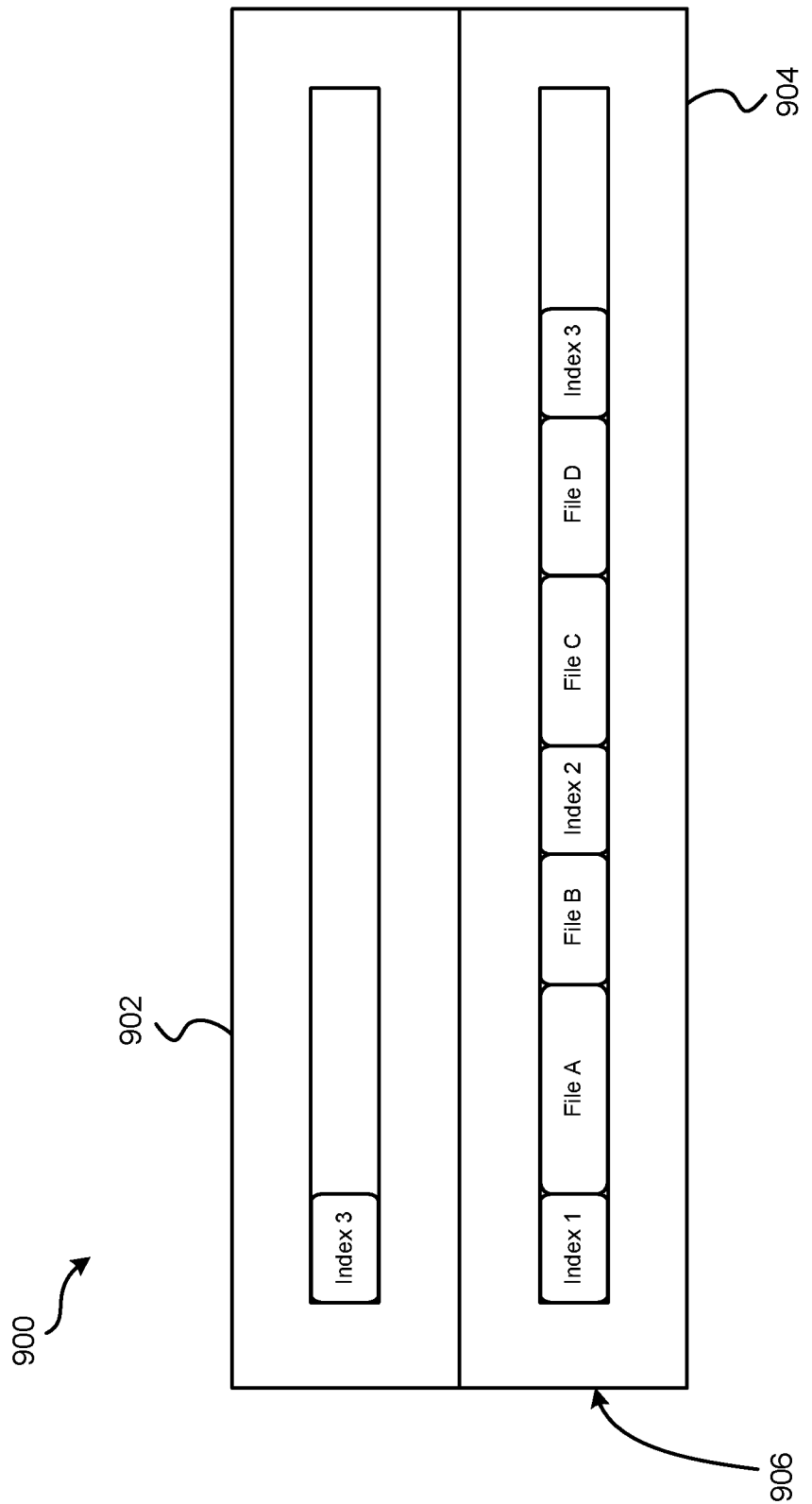
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 differently depending on the desired embodiment. According to some embodiments, the metadata of the index partition 902 may be updated in response to the tape being unmounted, e.g., such that the index may be read from the index partition when that tape is mounted again. The metadata may also be written in the data partition 902 so the tape may be mounted using the metadata recorded in the data partition 902, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

As previously mentioned, accessing data previously written to a magnetic tape typically involves locating the magnetic tape on which the data was written, retrieving the magnetic tape, loading the magnetic tape into a tape drive, aligning a magnetic head in the tape drive with the particular portion of the magnetic tape where the data is written, and actually reading the data. Attempts to reduce data access times for magnetic tape have introduced the use of caching in combination with the magnetic tape itself. As data is written to and/or read from magnetic tape, data is temporarily stored in a cache such that it is more easily and quickly accessible. However, as the amount of available space in the cache decreases during use, the data stored in the cache is flushed in response to receiving another memory space acquisition request, thereby freeing the cache to store other data corresponding to the request. Accordingly, the cache content is typically not flushed in units of complete files and/or in a desirable allocation order. For instance, when writing a particular file which has a size larger than the size of the cache, only a portion of the file remains in the cache at any point in time, thereby causing the file to be allocated to memory in discontinuous regions.

Conventional products experience reduced access times when attempting to read a file (e.g., a particular grouping of data) that has been allocated to memory in discontinuous regions. In order to read data that has been allocated to magnetic tape in discontinuous regions, a plurality of locate and read operations are performed in a tape drive accessing the magnetic tape. As a result, data access times remain undesirably slow in conventional magnetic tape-based products for data that has been allocated to memory in discontinuous regions.

In sharp contrast, various approaches described herein are able to significantly reduce data access times by implementing different data access and/or read operations depending on the situation. For instance, the operations performed to access a requested file (e.g., grouping of data) on magnetic tape may vary depending on the distance separating a current orientation of a magnetic tape head relative to the magnetic tape and the location of the requested file, e.g., as will be described in further detail below.

Figure 10:
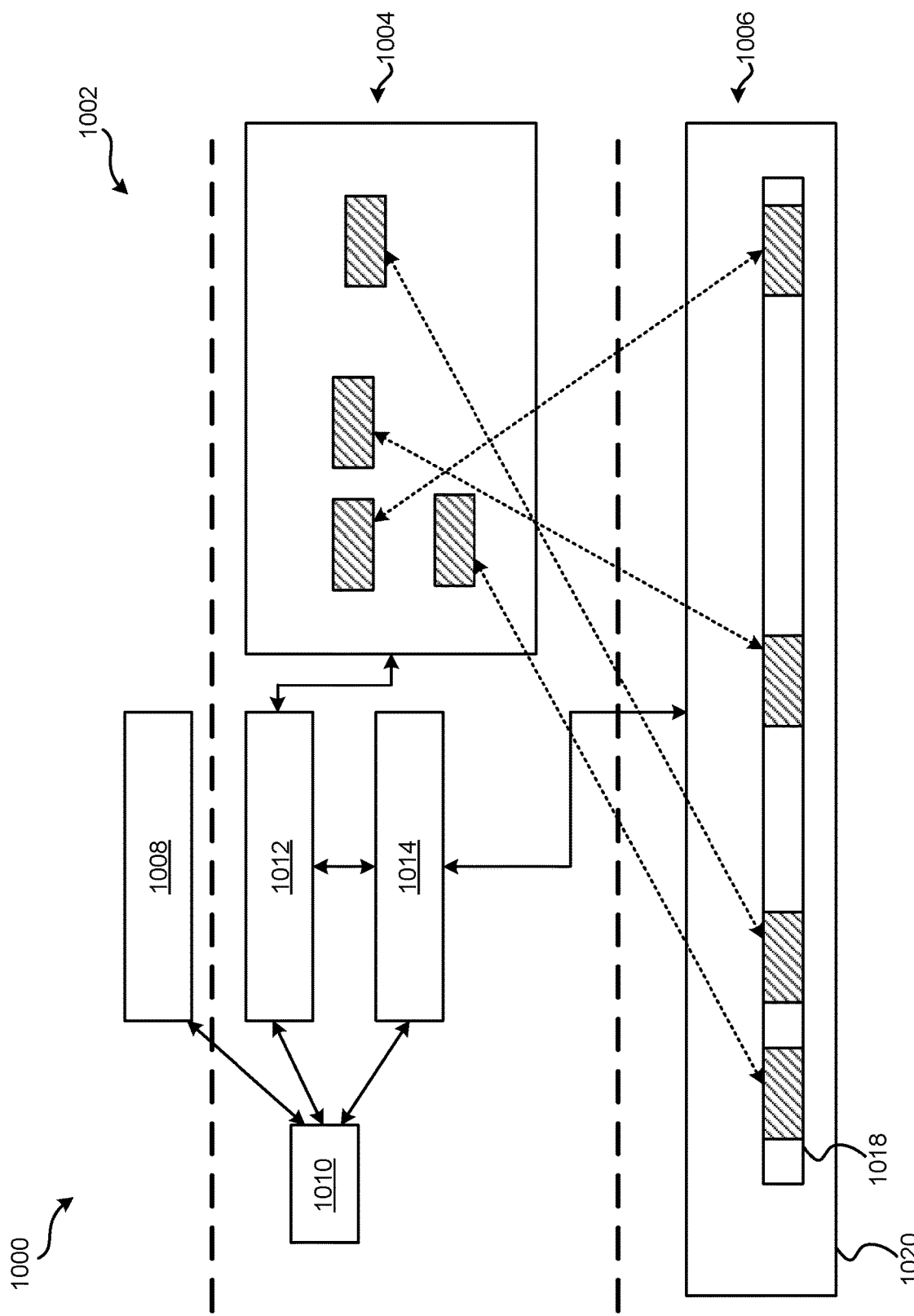
FIG. 10 is a partial representational view of a data storage system according to one embodiment.

Looking to FIG. 10, a representational view of a data storage system 1000 is illustrated in accordance with one embodiment. As an option, the present data storage system 1000 may be implemented in conjunction with features from any other embodiment listed herein, such as those described with reference to the other FIGS. However, such data storage system 1000 and others presented herein may be used in various applications and/or in permutations which may or may not be specifically described in the illustrative embodiments listed herein. Further, the data storage system 1000 presented herein may be used in any desired environment. Thus FIG. 10 (and the other FIGS.) may be deemed to include any possible permutation.

As shown, the representational view of a data storage system 1000 includes a user region 1002, a kernel level 1004 and a physical device level 1006. The user region 1002 includes an application 1008 which may provide a user a logical interface to store (write), access (read), update, etc. data stored in the data storage system 1000. The application 1008 may operate (e.g., run) on an electrical computing device which provides an interface that a user is able to use. For example, the application 1008 may operate on a personal computer, a mobile device, a tablet, etc. depending on the desired approach.

The application 1008 communicates with a controller 1010 located at the kernel level 1004 of the data storage system 1000. Moreover, the controller 1010 may communicate with a virtual file system (VFS) 1012 and a filesystem 1014. It should be noted that any of the components included in data storage system 1000 may be able to communicate (e.g., exchanges information) with each other using any desired connection. According to different approaches, two or more of the components included in the data storage system 1000 may be able to communicate with each other using a wireless electrical connection, e.g., a Bluetooth connection, a Wi-Fi connection, a cellular connection, etc.; using a wired electrical connection, e.g., an Ethernet connection, a wire, a cable, etc.; etc.

VFS 1012 is further coupled to an input/output (I/O) cache 1016 which includes memory used to store data, at least temporarily. Requested data that is contained in the I/O cache 1016 may be served simply by reading the data from the cache and providing it in response to the request. Because the I/O cache 1016 is a higher (e.g., faster) performing storage medium compared to magnetic tape, accessing requested data from I/O cache 1016 can be significantly faster than recomputing or fetching the requested data from its storage location on magnetic tape, e.g., as will be described in further detail below.

Referring still to FIG. 10, the VFS 1012 and filesystem 1014 are coupled to each other and may operate according to any approach which would be apparent to one skilled in the art after reading the present description. Moreover, the filesystem 1014 is coupled to (and able to communicate with) components located at the physical device level 1006. It follows that controller 1010 is able to communicate with various components at any of the user region 1002, kernel level 1004 and physical device level 1006. According to an illustrative approach, which is in no way intended to limit the invention, controller 1010 may be able to communicate with (e.g., issue commands to, receive data from, send data to, etc.) a tape drive included at the physical device level 1006.

Looking to the physical device level 1006, a representational view of a file 1018 stored on a magnetic tape 1020 is shown. According to preferred approaches, data is stored on the magnetic tape 1020 according to a linear tape file system (LTFS) format. Accordingly, file 1018 may be stored on magnetic tape 1020 according to an LTFS format. However, data may be stored on the magnetic tape 1020 according to any desired format depending on the approach.

Although not shown in the present embodiment, the magnetic tape 1020 may be loaded in a tape drive such that a magnetic tape head in the tape drive is able to access (read from and/or write to) a certain area of the magnetic tape 1020 (e.g., see FIG. 1A). The shaded portions of the file 1018 correspond to portions of data included in the I/O cache 1016. In other words, a copy of the data included in the shaded portions of the file 1018 are stored in the I/O cache 1016 as represented by the dashed lines.

As previously mentioned, I/O cache is a relatively higher performing storage medium, e.g., compared to magnetic disk and magnetic tape. Accordingly, accessing requested data from I/O cache can be noticeably faster than fetching the requested data from its other storage location(s) on magnetic media. In situations where a requested file has been allocated to a magnetic medium in discontinuous regions and/or only certain portions of a requested file remain in the I/O cache (e.g., see file 1018 of in FIG. 10), when the requested file is read, part of the file may be accessed from the I/O cache, while a remainder of the file is accessed from the magnetic medium. For situations where the magnetic medium is a magnetic disk, reading only select portions of the requested file from the disk does not cause a noticeable decrease in the speed at which the reading is performed due to the data structure of the file system on the magnetic disk and the physical structure of a physical disk system.

However, for situations where the magnetic medium is a magnetic tape, reading only select portions of the requested file from the tape results in undesirably slow data access times in conventional products. For instance, when a file that has been allocated to magnetic tape in discontinuous regions and/or only certain portions of a requested file remain in the I/O cache (e.g., see file 1018 of in FIG. 10) is read from its start position on the magnetic tape, conventional products issue a plurality of positioning commands (Locate) and reading commands (Read) to a tape drive. Thus, the data access time corresponding to reading such a file is dependent upon the amount of time it takes to perform the plurality of positioning commands. While reading some files from magnetic tape may only involve performing a limited number of positioning commands, reading other files may involve performing a substantial number of positioning commands. Accordingly, various embodiments described herein provide a process of determining an efficient way to read a given file depending on various factors, as will soon become apparent.

Figure 11A:
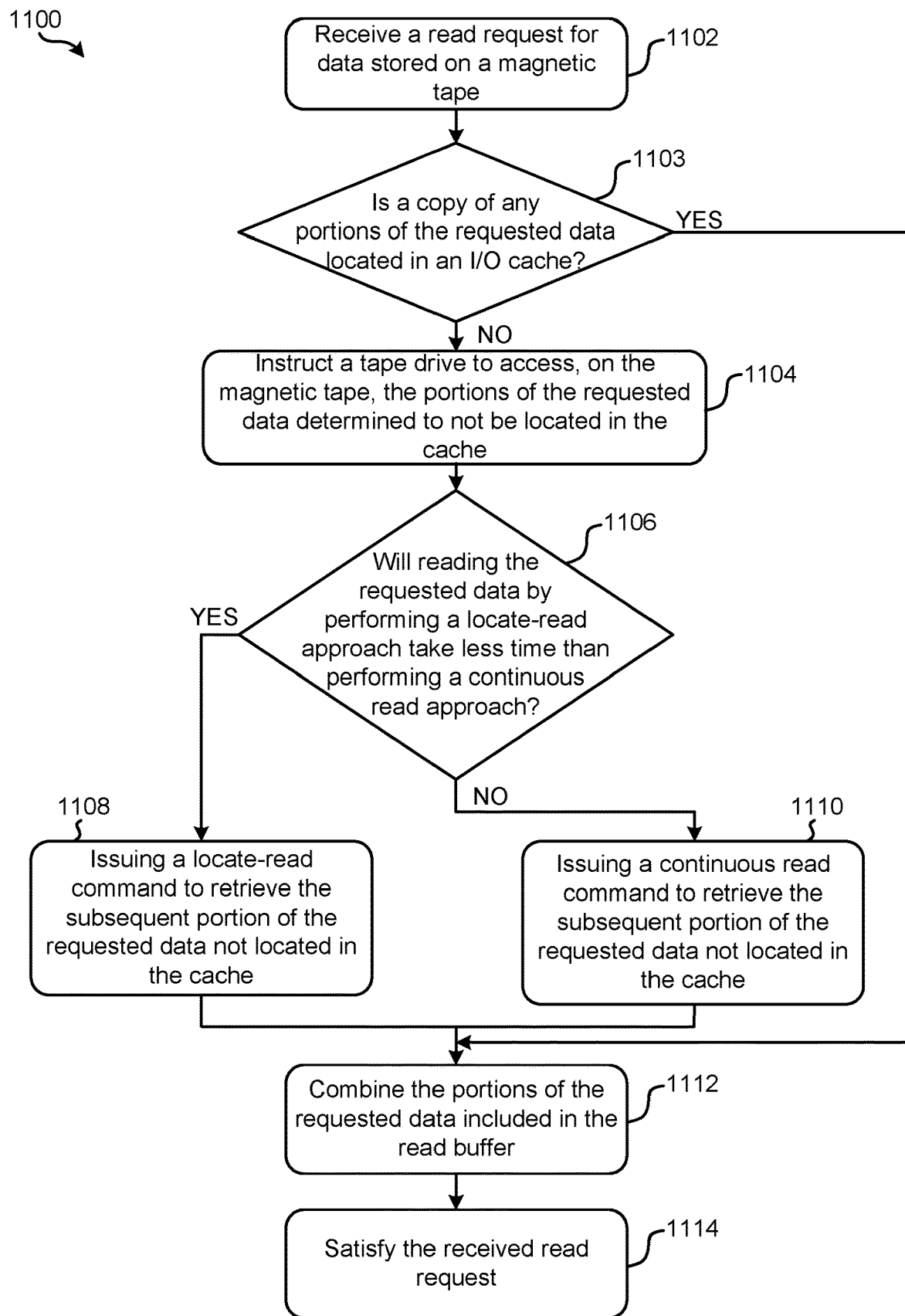
FIG. 11A is a flowchart of a method according to one embodiment.

Looking now to FIG. 11A, a flowchart of a method 1100 is shown according to one embodiment. The method 1100 may be performed in accordance with the present invention in any of the environments depicted in FIGS. 1A-10, among others, in various embodiments. Of course, more or less operations than those specifically described in FIG. 11A may be included in method 1100, as would be understood by one of skill in the art upon reading the present descriptions.

Each of the steps of the method 1100 may be performed by any suitable component of the operating environment. For example, one or more of the operations included in method 1100 may be performed by controller 1010 of data storage system 1000 in FIG. 10. However, in various embodiments, the method 1100 may be partially or entirely performed by a controller, a processor, a computer, etc., or some other device having one or more processors therein. Thus, in some embodiments, method 1100 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 11A, operation 1102 of method 1100 includes receiving a read request for data stored on a magnetic tape. According to some approaches, the read request received may indicate which file is to be read in order to access the requested data, an offset corresponding to the requested data, a size (e.g., amount) of the requested data, etc., which may assist a magnetic tape drive in accessing the requested data. For example, the read request received may include the following information: read ("FileA", offset=1 MB, size=128 KB). Depending on the size of the data requested (e.g., the amount of data requested), the requested data itself may include multiple portions. For example, operation 1102 may include receiving a read request for a 10 Gibibyte (GiB) file, where the 10 GiB file includes a plurality of data blocks (e.g., portions). According to an illustrative approach, the size of each of the data blocks themselves may be about 512 Kibibytes (KiB), but could be higher or lower. Moreover, the data may be stored on the magnetic tape according to an LTFS format.

Moreover, decision 1103 includes determining whether a copy of any of the portions of the requested data are located in a cache, e.g., such as an I/O cache as mentioned above. In response to determining that a copy of one or more portions of the requested data is located in the cache, method 1100 is shown as jumping to operation 1112 whereby the requested data may be combined in a read buffer. Once combined in the read buffer, the read request may be satisfied, e.g., as will be described in further detail below. In order to combine the portions of the requested data located in cache, jumping to operation 1112 may include requesting the portions from the cache, receiving the portions from the cache, and adding the portions received from the cache to the read buffer. It may also be desired to determine whether any other portions of the requested data that have not yet been evaluated (e.g., read). In response to determining that there are one or more portions of the requested data that have not been evaluated, method 1100 may return to decision 1106 or operation 1104 such that the remaining portions of the requested data may be accessed from cache or from a magnetic tape.

It should be noted that this traversal of the flowchart in FIG. 11A may be reserved for situations where all of the requested data is located in cache such that the read request may be satisfied without reading any data from magnetic tape. However, in some approaches, a copy of only some of the requested data may be located in cache, while a remainder of the requested data may only be located on the magnetic tape. In such approaches, a remainder of method 1100 and/or some of the processes included in FIGS. 11B-11D may be performed, e.g., as would be appreciated by one skilled in the art after reading the present description.

In response to determining that a copy of one or more portions of the requested data are not located in cache (e.g., an I/O cache), method 1100 proceeds to operation 1104, which includes instructing a tape drive to access, on the magnetic tape, the portions of the requested data determined to not be located in the cache. As alluded to above, it is preferred that portions of the requested data which have a copy currently stored in cache are added to a read buffer directly from cache as opposed to being read from magnetic tape. Thus, the process of satisfying the received read request may include gathering portions of the requested data from the magnetic tape in addition to gathering other portions from cache, e.g., as described in the various approaches herein.

A data storage system may include any number of different magnetic tapes. For instance, a data storage system may include a tape library which includes a multitude of magnetic tapes. Thus, depending on where the magnetic tape having the requested data is located relative to the tape drive, additional processes may be performed before the tape drive is actually able to access the requested data. According to one example, which is in no way intended to limit the invention, the data storage system may determine that the requested data is stored on a magnetic tape in a tape cartridge stowed in a storage slot of a tape library. Thus, a gripper assembly of an accessor may be used to engage (e.g., grab) the tape cartridge having the magnetic tape and transport the tape cartridge to the tape drive such that the magnetic tape may be mounted in the tape drive. However, according to another example, which is again in no way intended to limit the invention, the data storage system may determine that the requested data is located on a magnetic tape that was already mounted in the tape drive at the time that the read request was received.

Once it is determined that the magnetic tape having the requested data is mounted in the tape drive, the tape drive may wind and/or unwind the magnetic tape such that a magnetic tape head in the tape drive is located at about a beginning of the requested data, or any desired portion thereof. According to an illustrative approach, one or more drive motors may be used to drive a tape supply cartridge and/or take-up reel to move the magnetic tape over a magnetic tape head in response to receiving the instructions sent in operation 1104.

It follows that the magnetic tape on which the data is stored may or may not already be loaded in a tape drive depending on the situation. Accordingly, referring momentarily to FIG. 11B, exemplary sub-processes of ensuring a magnetic tape on which the requested data is loaded into a tape drive to access the beginning of the requested data on the magnetic tape are illustrated in accordance with one embodiment, one or more of which may be used to perform operation 1104 of FIG. 11A. However, it should be noted that the sub-processes of FIG. 11B are illustrated in accordance with one embodiment which is in no way intended to limit the invention.

As shown, sub-operation 1120 includes determining a magnetic tape on which the requested data is stored. According to preferred approaches, magnetic tape is stored in a tape cartridge which may in turn be stored in storage slots of a tape library. Accordingly, sub-operation 1120 may actually be performed by determining the tape cartridge which is storing the magnetic tape on which the requested data is stored. Tape cartridges may be identified by a barcode, an identification number, a radio-frequency identification (RFID) chip, etc. accessible on/from an exterior of the tape cartridge housing. Moreover, a lookup table in memory may keep track of which magnetic tapes are stored in each tape cartridge, and the data stored on such magnetic tapes.

Once the magnetic tape on which the requested data has been identified, decision 1122 includes determining whether the identified magnetic tape is already loaded in a tape drive of a storage library. In response to determining that the magnetic tape is already loaded in a tape drive, the flowchart proceeds to decision 1106 of FIG. 11A below. However, it should be noted that additional processes may be performed in response to determining that the magnetic tape having the desired data is already loaded in a tape drive. According to an illustrative in-use example, which is in no way intended to limit the invention, FIG. 14A below includes several processes which may be performed in order to minimize data access times by determining an efficient manner in which the magnetic tape is wound and/or unwound to arrive at the requested data.

Figure 11B:
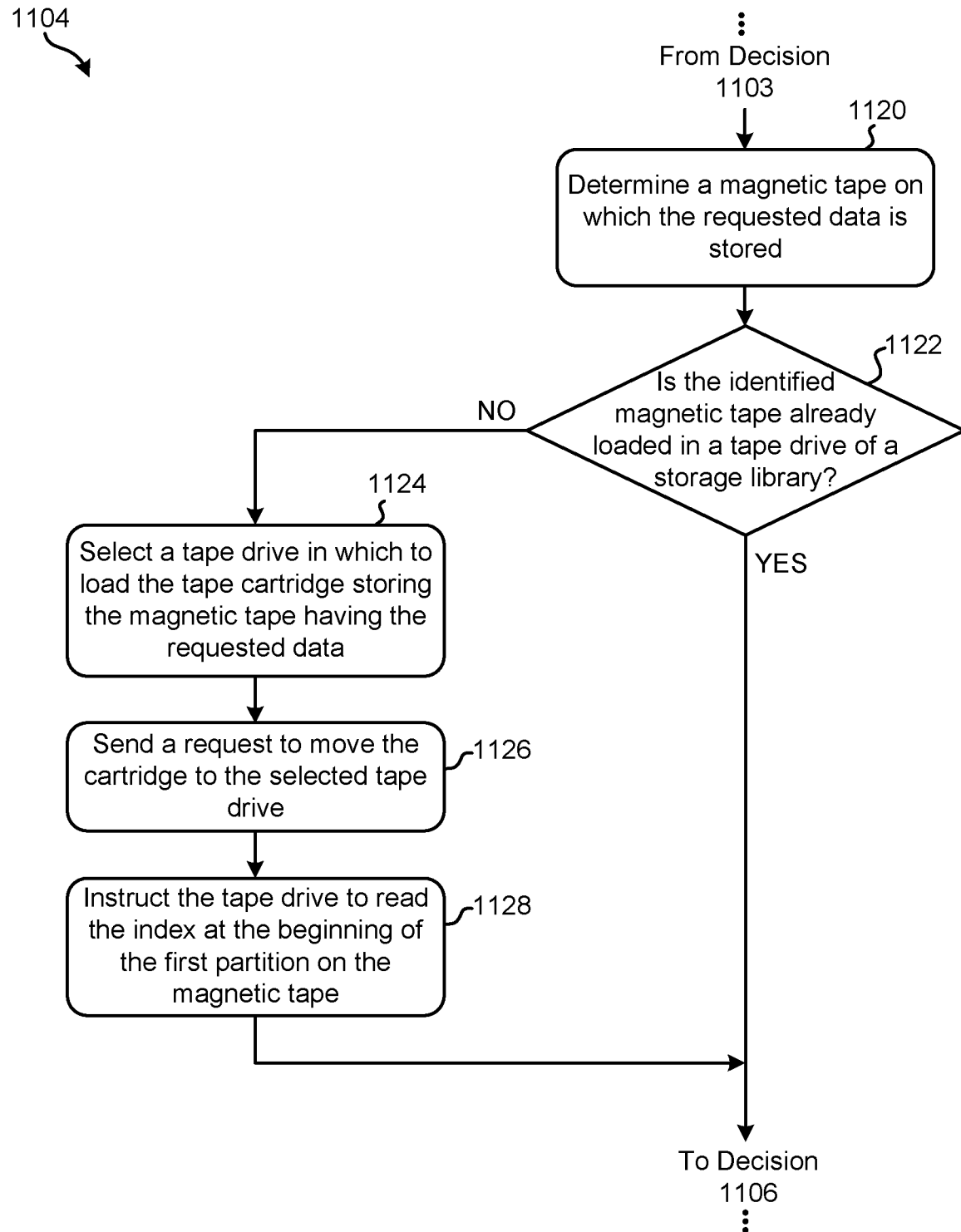
FIG. 11B is a flowchart of sub-processes for one of the operations in the flowchart of FIG. 11A according to one embodiment.

Returning to decision 1122, in response to determining that the magnetic tape is not already loaded in a tape drive, the flowchart of FIG. 11B proceeds to sub-operation 1124. There, sub-operation 1124 includes selecting a tape drive in which to load (e.g., mount) the tape cartridge storing the magnetic tape having the requested data stored thereon. Moreover, sub-operation 1126 includes sending (e.g. issuing) a request to move the cartridge to the selected tape drive. According to some approaches, sub-operation 1126 may be performed by instructing an automated robotic accessor to engage the tape cartridge (e.g., using a gripper assembly) and physically transport the tape cartridge from a current location (e.g., a storage slot) to the selected drive.

Furthermore, sub-operation 1128 includes instructing the tape drive to read the index at the beginning of the first partition on the magnetic tape. Information regarding a position of the requested data on the magnetic tape may be gathered by reading the index at the beginning of the first partition on the magnetic tape. Moreover, the tape drive may perform any desired combination of locate operations in order to progress the magnetic tape such that a magnetic head of the tape drive is positioned over (e.g., vertically adjacent) to a beginning of the requested data, e.g., according to any of the approaches described herein.

From sub-operation 1128, the flowchart proceeds directly to decision 1106 of FIG. 11A. Accordingly, returning now to FIG. 11A, decision 1106 includes determining, for each of the portions of the requested data that are not located in the cache, whether performing a locate command or performing a read command a plurality of times (while discarding any returned data corresponding to portions of the requested data determined to also be located in the cache) will retrieve the portions of the requested data that are not located in the cache in a shorter amount of time. In other words, decision 1106 includes determining whether reading the portions of the requested data that are not located in the cache using a locate-read approach will take less time than reading the requested data using a continuous read approach. As previously mentioned, some of the multiple portions of the requested data may be located on the magnetic tape while also being located in a cache, while other ones of the multiple portions of the requested data may only be located on the magnetic tape. For example, referring momentarily back to FIG. 10, the shaded portions of the requested file 1018 are located on the magnetic tape 1020 as well as in the I/O cache 1016. However, the unshaded portions of the requested file 1018 are only located on the magnetic tape 1020. Accordingly, decision 1106 may be determining whether reading a next portion of the requested data may be conducted more efficiently by using a locate-read approach or using a continuous read approach to advance the tape to a position corresponding to the next portion of the requested data. It also follows that decision 1106 may be performed for each portion of the requested data, e.g., in an iterative fashion as will be described in further detail below. However, in some approaches all portions of the requested data that are not located in the cache may be evaluated as a whole in order to determine whether an aggregate amount of time corresponding to performing a locate command or performing a read command a plurality of times while discarding any returned data corresponding to portions of the requested data determined to also be located in the cache.

Using a locate-read approach to read the requested data includes reading the portions of the requested data that are only stored on the magnetic tape, while skipping over the portions of the requested data that are also located in cache. The portions of the requested data that are also located in cache may be skipped over by performing a locate command which progresses the tape to the next portion of the requested data only stored on the magnetic tape. As described above, this approach may introduce a greater amount of processing time than a continuous read approach which includes performing a number of continuous read operations, but this depends on a number of different factors.

For example, locate searches for the position of a subsequent portion of the requested data (e.g., a target record) are processed through firmware, even when the portion has already been stored in a buffer inside the tape drive. As a result, locate commands take a relatively longer time ti to process. Even after the locate command has been performed, the tape drive must perform a read operation immediately following. Moreover, reading right after a locate command involves a setting time for hardware in the firmware, and thus takes a relatively longer time $t_{r1}$ to perform as well. However, performing a number of continuous read operations is processed with hardware but not with firmware, and thus takes an extremely low amount of time $t_{r2}$ to perform. This is partly due to tape drives typically having characteristics highly optimized for continuous reading in the forward direction.

The actual amount of time it takes to process each of these different operations may vary depending on the type (e.g., generation), configuration, etc. of the given tape drive. Thus, a tape drive may be tested after it is produced in order to determine values associated with these different processing times. These values may further be stored in memory (e.g., a lookup table) of the tape drive for future reference. According to an example, which is in no way intended to limit the invention, an LTO8 tape drive accessing a record of 512 Kilobytes (KB) may have a locate command processing time $t_l$ of 11.9 ms, a read after locate processing time $t_{r1}$ of 9.3 ms, and a continuous read processing time $t_{r2}$ of 1.4 ms. Once determined, these values may be fixed after activation of the tape drive, or may be updated through statistics calculation when the corresponding commands are issued after activation of the tape drive.

Despite the relatively faster and slower performance times associated with performing a locate command versus a number of continuous read operations, these performance times are at least somewhat dependent on the amount of space separating a current position and a subsequent portion of the requested data on the magnetic tape. Equation 1 provides an exemplary way to determine whether a first amount of time associated with performing a locate operation to advance the magnetic tape from a current position to the subsequent portion of the requested data is less than a second amount of time associated with performing a number of continuous read operations to advance the magnetic tape from the current position to the subsequent portion of the requested data. Accordingly, Equation 1 may be used to perform decision 1106 in some approaches.

$$(P_D-P_C)t_{r2}+t_{r2}>(P_D-P_C+1)t_{r2} \quad \text{Equation 1}$$

It follows that Equation 1 may be simplified to Equation 1.1 which may also be used according to any of the approaches described herein.

$$(P_D-P_C+1)t_{r2}>t_l+t_{r1} \quad \text{Equation 1.1}$$

Here, $P_D$ represents the starting position of the subsequent portion of the requested data, while $P_C$ represents the current position (e.g., location) of the magnetic tape head relative to the magnetic tape. Accordingly, whether or not performing a number of continuous read operations takes less time than performing a locate operation followed by a read operation depends on a distance between the starting position of the subsequent portion of the requested data (the "first position") and the current position of the magnetic tape head relative to the magnetic tape (the "second position").

It follows that in some approaches, rather than determining whether Equation 1 is true on the fly for specific values of $P_D$ and $P_C$ during use, Equation 1 may be used to determine a range of relative values for $P_D$ and $P_C$ which result in the logical statement being true for a given tape drive. In other words, because the locate command processing time $t_l$, the read after locate processing time $t_{r1}$, and the continuous read processing time $t_{r2}$ may all be known (or at least may be determined) for a given tape drive, a range of values for $(P_D-P_C+1)$ which result in Equation 1 being true may be determined. Moreover, a range of values for $P_D$ and $P_C$ which result in a value for $(P_D-P_C+1)$ that is in the determined range may also be extrapolated and stored in memory, e.g., such as a lookup table. Thus, in some approaches decision 1106 may be determined by accessing a lookup table to determine whether the distance along the longitudinal length of the magnetic tape separating the "first position" from the "second position" is in a predetermined range which results in Equation 1 being true.

Figure 12:
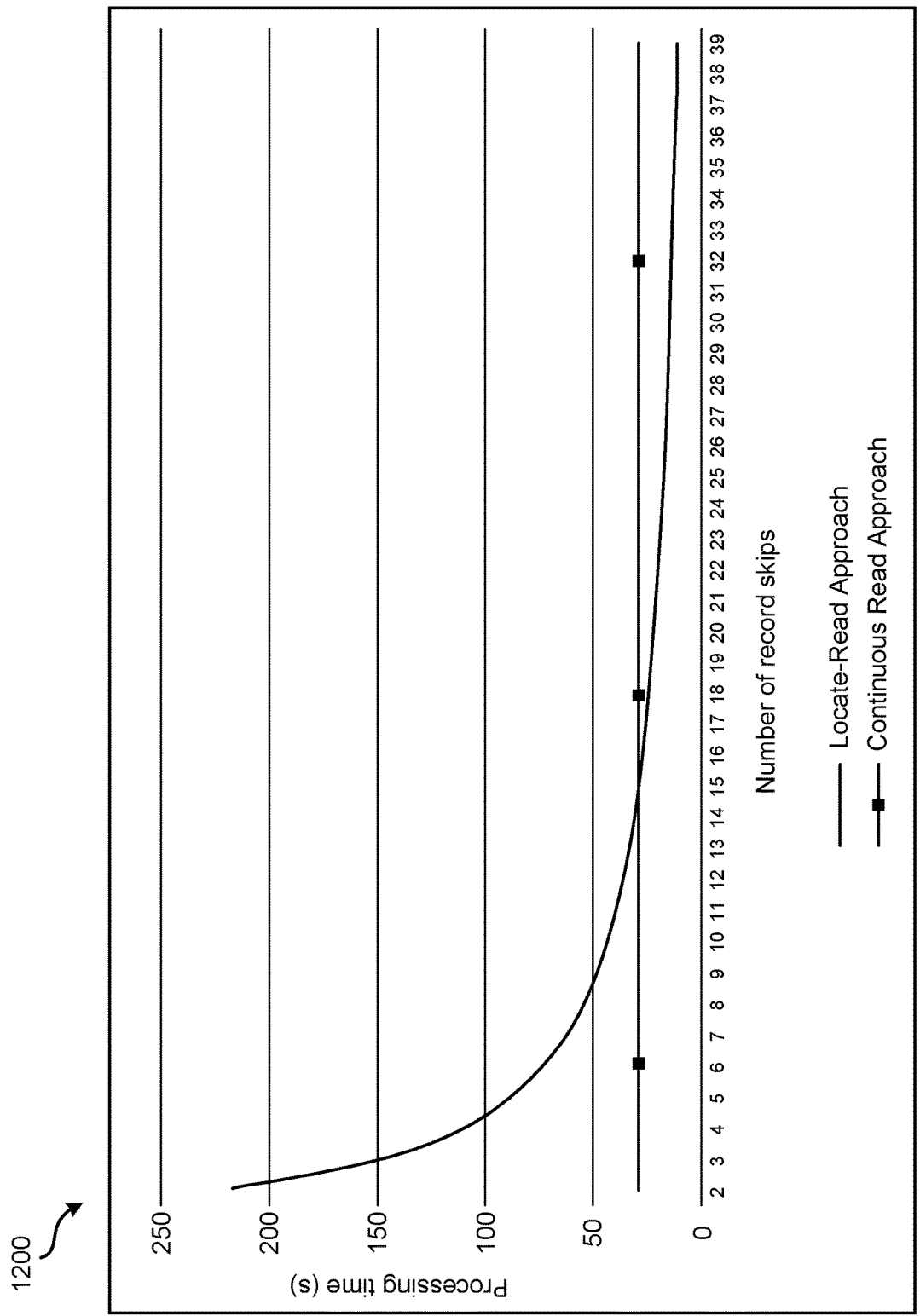
FIG. 12 is a graph of the number of record skips vs. processing time according to one embodiment.

Looking momentarily now to FIG. 12, a graph 1200 is presented which illustrates the processing times associated with following a locate-read approach versus a continuous read approach for different numbers of portions that are skipped over by an exemplary LTO8 tape drive. The data used to form the plots of graph 1200 was generated according to calculated experimentation based on measured experimental results.

Implementing the continuous read approach results in a constant processing time because this approach is unaffected by the number of portions of the requested data that are stored in cache as well as on the magnetic tape. However, the locate-read approach is shown to cause a significant increase in processing time as the number of portions of the requested data are skipped over. For clarity, it should be noted that the numbers along the x-axis represent the average number of portions of the requested data in which a skip occurs. For example, a value of 2 along the x-axis represents a situation where one in every two portions of the requested data is skipped during reading. The plots represent the relationship between the locate-read approach and the continuous read approach. Thus, the location that the two plots intersect represents the point at which the efficiency of the two approaches switch. It follows that the precise location that the two plots intersect, or even the plots themselves, may vary depending on the particular tape drive.

Figure 11C:
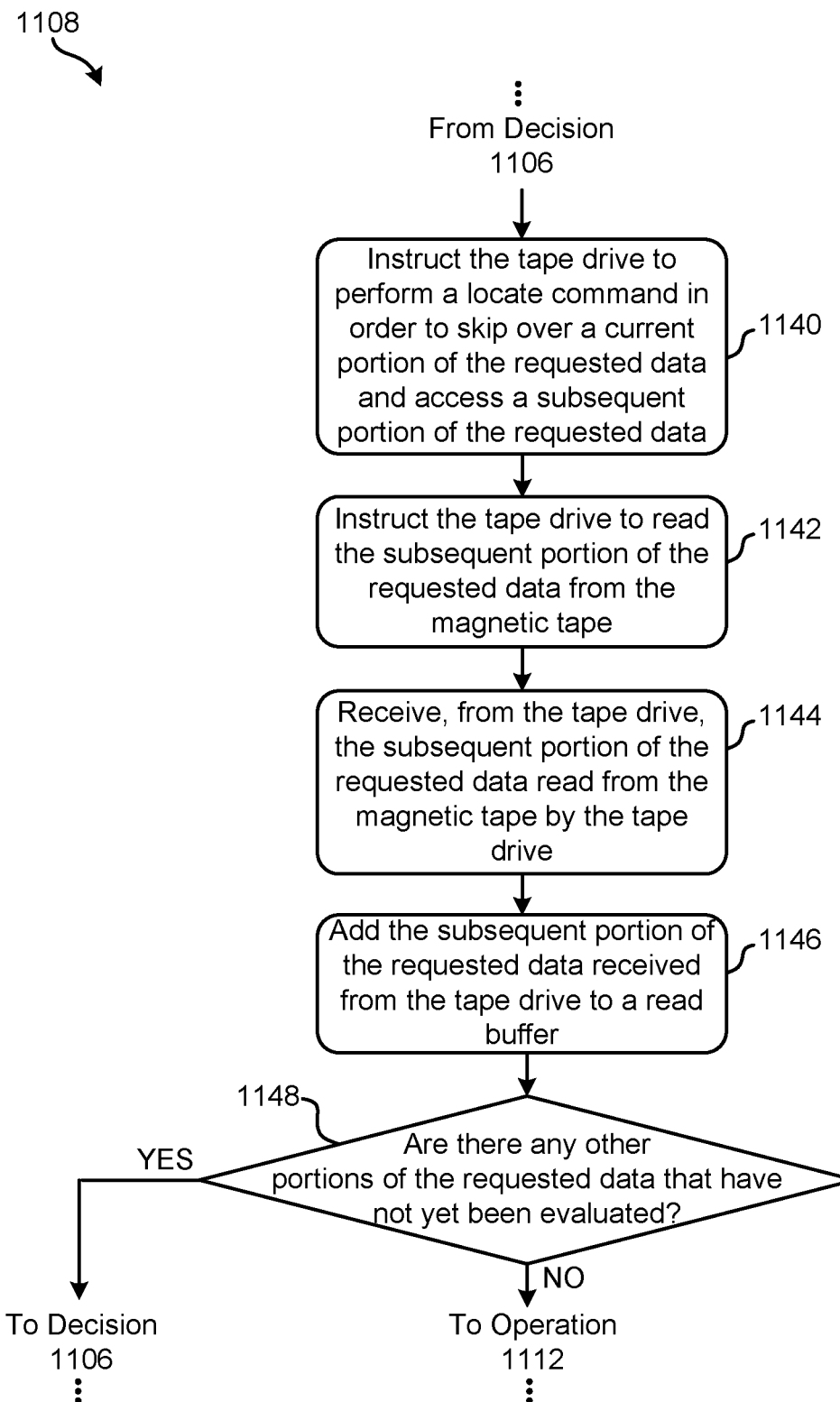
FIG. 11C is a flowchart of sub-processes for one of the operations in the flowchart of FIG. 11A according to one embodiment.

Accordingly, returning to decision 1106, it may be more desirable to read a subsequent portion of the requested data using a specific one of the locate-read approach and continuous read approach depending on the situation. As shown, method 1100 proceeds to operation 1108 in response to determining that reading a subsequent portion of the requested data using a locate-read approach will take less time than reading a subsequent portion of the requested data using a continuous read approach. There, operation 1108 includes issuing the locate-read command to retrieve the subsequent portion of the requested data not located in the cache. Although operation 1108 may only be performed once for a subsequent portion of the requested data, in other approaches operation 1108 may be performed as a part of an iterative process for multiple portions of the requested data. Referring momentarily to FIG. 11C, exemplary sub-operations of performing the locate-read approach for the subsequent portion of the requested data are illustrated in accordance with one embodiment, one or more of which may be used to perform operation 1108 of FIG. 11A. However, it should be noted that the sub-operations of FIG. 11C are illustrated in accordance with one embodiment which is in no way intended to limit the invention.

As shown, the flowchart of FIG. 11C includes instructing the tape drive to perform a locate command in order to skip over a current portion of the requested data and access a "subsequent portion" of the requested data. See sub-operation 1140. As previously mentioned, a current portion of the requested data (which the magnetic head of the tape drive is currently positioned over) may not be read by the tape head for a number of reasons. According to some approaches, the current portion of the requested data may be stored in cache and may therefore be added to the read buffer directly from the cache. Moreover, it should be noted that the term "subsequent portion" is intended to refer to a next portion of the requested data stored on the magnetic tape after a portion of the requested data currently accessible by the magnetic head of the tape drive. Thus, each time the term "subsequent portion" is used in relation to FIG. 11C, it is referring to the same subsequent portion of the requested data.

Regardless of the reason for skipping over the portion of the requested data currently accessible by the magnetic head, sub-operation 1142 includes instructing the tape drive to read the subsequent portion of the requested data (now positioned about under the magnetic head of the tape drive) from the magnetic tape. Moreover, although not shown in FIG. 11C, the flowchart may additionally include requesting the subsequent portion of the requested data read from the magnetic tape. In other words, the flowchart may include requesting the data read in operation 1142 from the tape drive. The tape drive may provide the data read via a wired electrical connection (e.g., see FIG. 10), a wireless connection (e.g., using an antenna), or any other desired manner of transferring information to the component performing the various processes described herein.

Moreover, sub-operation 1144 includes receiving, from the tape drive, the subsequent portion of the requested data read from the magnetic tape by the tape drive. Sub-operation 1146 also includes adding the subsequent portion of the requested data received from (and read by) the tape drive to a read buffer.

As shown, the flowchart of FIG. 11C progresses to decision 1148 from sub-operation 1146. There, decision 1148 includes determining whether there are any other portions of the requested data that have not yet been evaluated (e.g., read). The flowchart may return to decision 1106 in response to determining that there is at least one portion of the requested data that has not yet been read, and any ones of the processes included in FIG. 11A-11D may be performed or repeated for the at least one portion determined to have not yet been evaluated. However, in response to determining that there are no more portions of the requested data left to evaluate, the flowchart returns directly to operation 1112 of FIG. 11A.

Figure 11D:
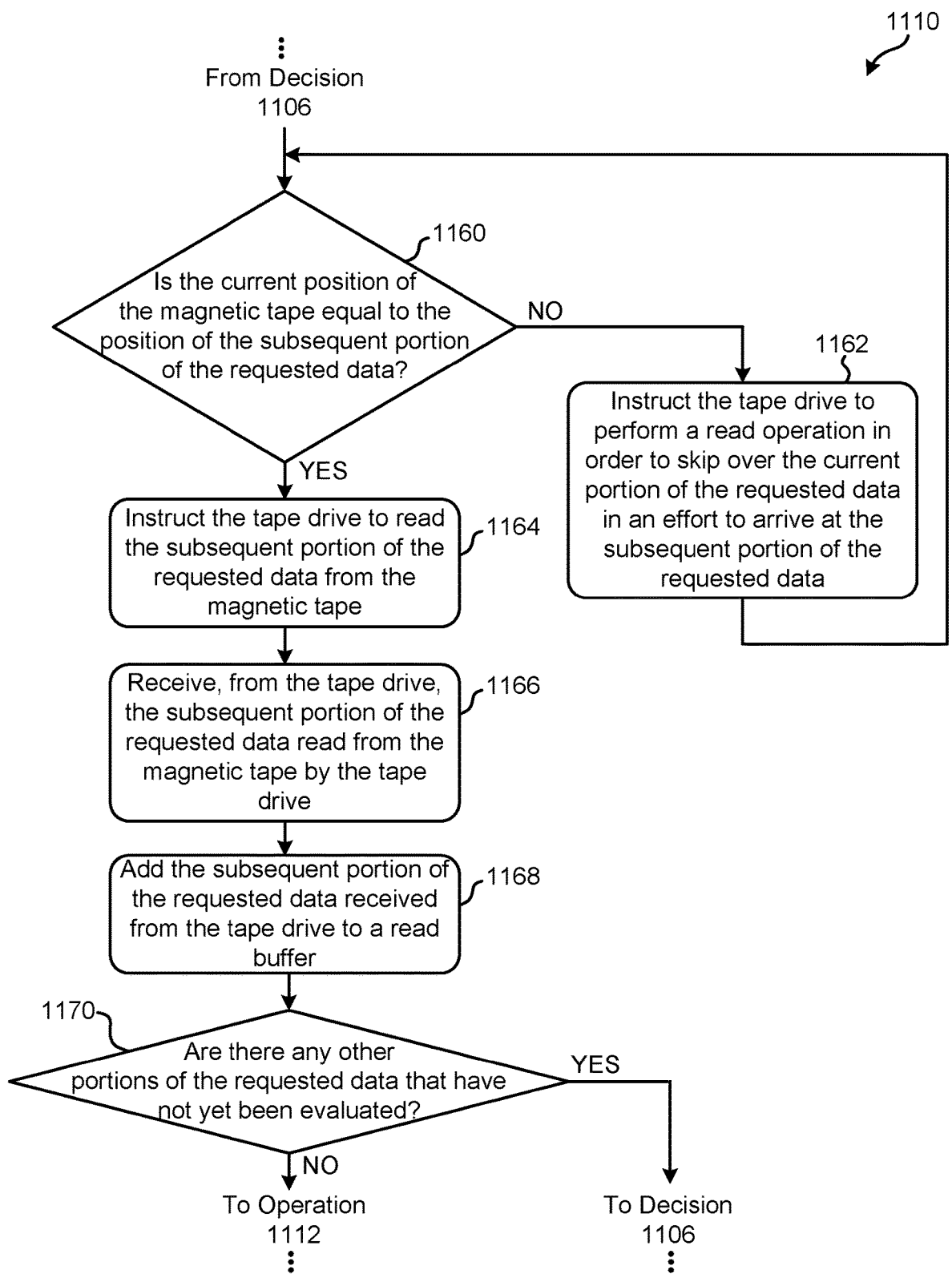
FIG. 11D is a flowchart of sub-processes for one of the operations in the flowchart of FIG. 11A according to one embodiment.

Returning to decision 1106 of FIG. 11A, method 1100 may alternatively proceed to operation 1110 in response to determining that reading a subsequent portion of the requested data using a locate-read approach will not take less time than reading a subsequent portion of the requested data using a continuous read approach. There, operation 1110 includes issuing the continuous read command to retrieve the subsequent portion of the requested data not located in the cache. Although operation 1110 may only be performed once for a subsequent portion of the requested data, in other approaches operation 1110 may be performed as a part of an iterative process for multiple portions of the requested data. Referring momentarily now to FIG. 11D, exemplary sub-operations of performing the continuous read approach for the subsequent portion of the requested data are illustrated in accordance with one embodiment, one or more of which may be used to perform operation 1110 of FIG. 11A. However, it should be noted that the sub-operations of FIG. 11D are illustrated in accordance with one embodiment which is in no way intended to limit the invention.

As shown, the flowchart of FIG. 11D includes determining whether the current position (e.g., location) of the magnetic tape relative to a magnetic head of the tape drive is such that the magnetic tape head is able to access a "subsequent portion" of the requested data. See decision 1160. In other words, decision 1160 includes determining whether the current position of the magnetic tape is equal to the position of the subsequent portion of the requested data. Again, a current portion of the requested data (which the magnetic head of the tape drive is currently positioned over) may not be read by the tape head for a number of reasons. According to some approaches, the current portion of the requested data may be stored in cache and may therefore be added to the read buffer directly from the cache. Moreover, it should be noted that the term "subsequent portion" is intended to reference a next portion of the requested data stored on the magnetic tape after a portion of the requested data currently accessible by the magnetic head of the tape drive. Thus, each time the term "subsequent portion" is used in relation to FIG. 11D, it is referring to the same subsequent portion of the requested data.

As shown, in response to determining that the current position of the magnetic tape relative to the magnetic tape head is not equal to the subsequent portion of the requested data, the flowchart proceeds to sub-operation 1162. There sub-operation 1162 includes instructing the tape drive to perform a read operation in order to skip over the current portion of the requested data in an effort to arrive at the subsequent portion of the requested data. After performing sub-operation 1162, the flowchart returns to decision 1160 which may be performed again.

However, in response to determining that the current position of the magnetic tape relative to the magnetic tape head is equal to the subsequent portion of the requested data, the flowchart proceeds to sub-operation 1164. There, sub-operation 1164 includes instructing the tape drive to read the subsequent portion of the requested data (now positioned about under the magnetic head of the tape drive) from the magnetic tape. Moreover, although not shown in FIG. 11D, the flowchart may additionally include requesting the subsequent portion of the requested data read from the magnetic tape. In other words, the flowchart may include requesting the data read in operation 1164 from the tape drive. The tape drive may provide the data read via a wired electrical connection (e.g., see FIG. 10), a wireless connection (e.g., using an antenna), or any other desired manner of transferring information to the component performing the various processes described herein.

Moreover, sub-operation 1166 includes receiving, from the tape drive, the subsequent portion of the requested data read from the magnetic tape by the tape drive. Sub-operation 1168 also includes adding the subsequent portion of the requested data received from (and read by) the tape drive to a read buffer.

As shown, the flowchart of FIG. 11D further progresses to decision 1170 from sub-operation 1168. There, decision 1170 includes determining whether there are any other portions of the requested data that have not yet been evaluated (e.g., read). The flowchart may return to decision 1106 in response to determining that there is at least one portion of the requested data that has not yet been read, and any ones of the processes included in FIG. 11A-11D may be performed or repeated for the at least one portion determined to have not yet been evaluated. However, in response to determining that there are no more portions of the requested data left to evaluate, the flowchart returns directly to operation 1112 of FIG. 11A.

Returning FIG. 11A, operation 1112 includes combining the portions of the requested data included in the read buffer. Accordingly, operation 1112 includes combining the portions of the requested data that are not located in the cache with the portion of the requested data located in the cache. Moreover, operation 1114 includes satisfying the received read request, e.g., using the combined portions of the requested data. The portions of the requested data included in the read buffer may be combined according to any approach which would be apparent to one skilled in the art after reading the present description. For example, the portions of the requested data may be merged into a single file which may then be provided in response to the received request. Moreover, the read request may be satisfied by sending the requested data to a source of the received read request, informing a user who issued the read request that the requested data is available, providing access to the requested data, etc.

It should be noted that although the various operations of method 1100 and sub-processes described in FIGS. 11B-11D are illustrated as being performed in relation to each other, specific ones of the operations and/or sub-processes may be performed separately depending on the desired embodiment. For example, the process of determining whether a first amount of time associated with performing a locate operation to advance a magnetic tape from the second position to the first position, or a second amount of time associated with performing a number of continuous read operations to advance the magnetic tape from the second position to the first position is less may be determined separately from satisfying a read request. For example, various decisions and/or sub-operations may be implemented in order to determine a most time efficient way to access a desired portion of a magnetic tape in order to perform a write operation.

Similarly, it should be noted that various ones of the sub-processes included in FIGS. 11B-11D may be performed in a different order than that shown. For example, rather than determining whether a copy of a single portion of the requested data is located in an I/O cache after the portion is read (see decision 1162 of FIG. 11D), a determination may be made as to whether each of the number of portions of the requested data are located in the cache, e.g., such that a request for the portions determined to be located in the cache may be issued in parallel to reading the portions from the magnetic tape. According to another example, rather than adding each of the portions of the requested data to the read buffer individually, all or some of the portions of the requested data determined to be located in the cache may be received from the cache together (e.g., to reduce system throughput) and added to the read buffer together. In some approaches the portions of the requested data received from cache may be added to the read buffer together with the portions of the requested data read (and not discarded) from the magnetic tape.

Figure 13:
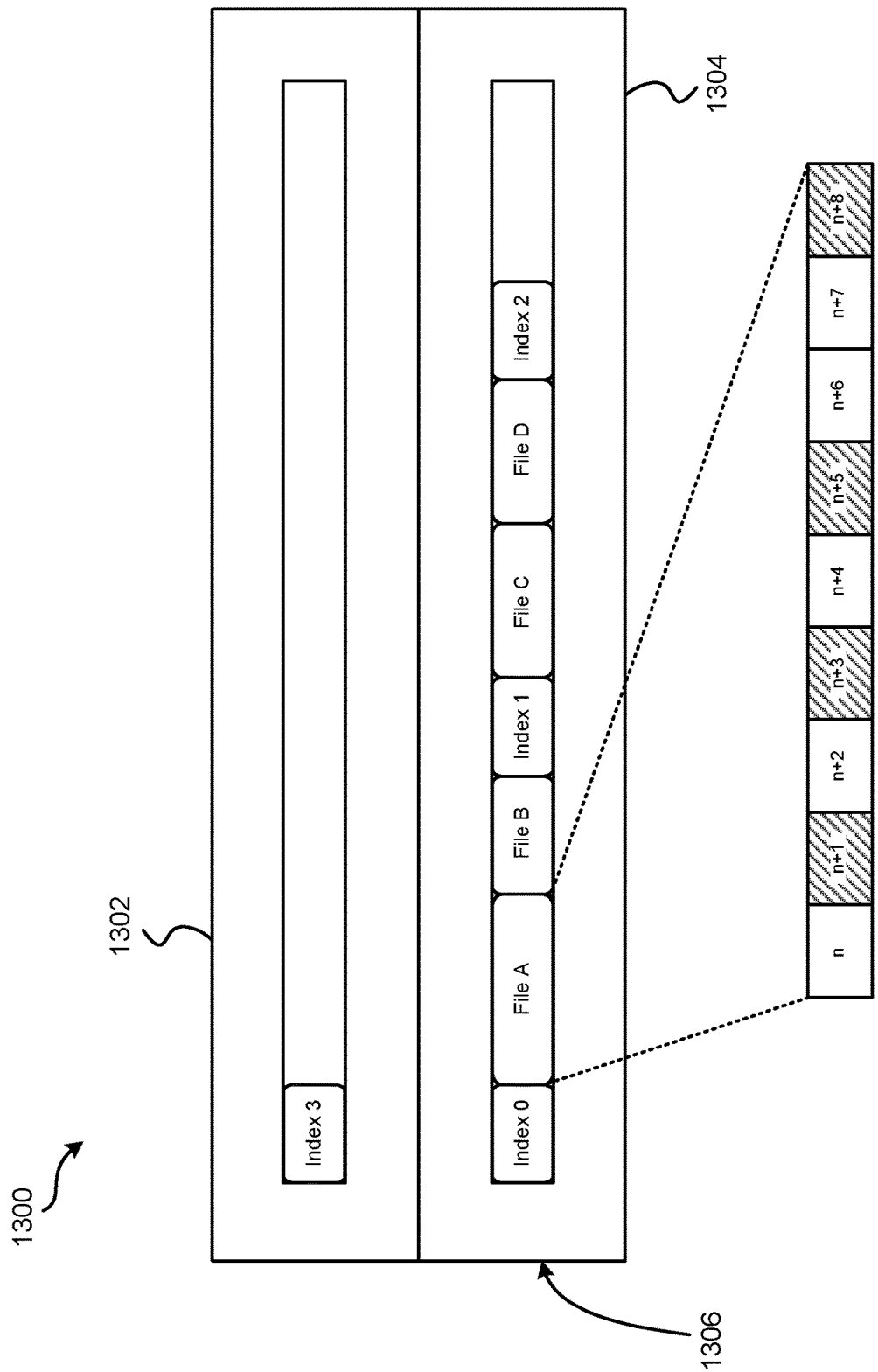
FIG. 13 is a representational diagram of files and indexes stored on a magnetic tape according to one embodiment.

Looking to FIG. 13, an in-use example, which is in no way intended to limit the invention, is illustrated in accordance with a magnetic tape 1300 having an index partition 1302 and a data partition 1304. As shown, data files File A-File D and indexes Index 0-Index 3 are stored on the tape. The LTFS format allows for index information to be recorded in the index partition 1302 at the beginning of tape 1306, as would be appreciated by one skilled in the art upon reading the present description.

Looking specifically to File A, a detailed view of the file shows that it includes a plurality of different portions (e.g., "records", blocks, etc.). As described above, some of the portions may be stored in a cache in addition to on the magnetic tape, while other portions are only stored on the magnetic tape. In the present in-use example, portions n+1, n+3, n+5 and n+8 are stored on both the magnetic tape and in a cache, and are shaded to represent this. Portions n, n+2, n+4, n+6 and n+7 however are only stored on the magnetic tape.

A request for portions n through n+8 of File A may be received by a tape-based data storage system implementing the LTFS format shown. In response to receiving the request, a controller (or other processing component) electrically coupled to a magnetic tape drive in which magnetic tape 1300 is mounted, may perform the following processes:
 1. Locate to portion n.
 2. Read portion n.
 3. LTFS does not receive a request for the region of portion n+1, which is cached, and is therefore processed by the VFS.
 4. Read portion n+1 and discard of the data included in portion n+1.
 5. Read portion n+2.
 6. LTFS does not receive a request for the region of portion n+3, which is cached, and is therefore processed by the VFS.
 7. Read portion n+3 and discard of the data included in portion n+3.
 8. Read portion n+4.

9. LTFS does not receive a request for the region of portion n+5, which is cached, and is therefore processed by the VFS.
10. Read portion n+5 and discard of the data included in portion n+5.
11. Read portion n+6.
12. Read portion n+7.
13. LTFS does not receive a request for the region of portion n+8, which is cached, and is therefore processed by the VFS.

Figure 14A:
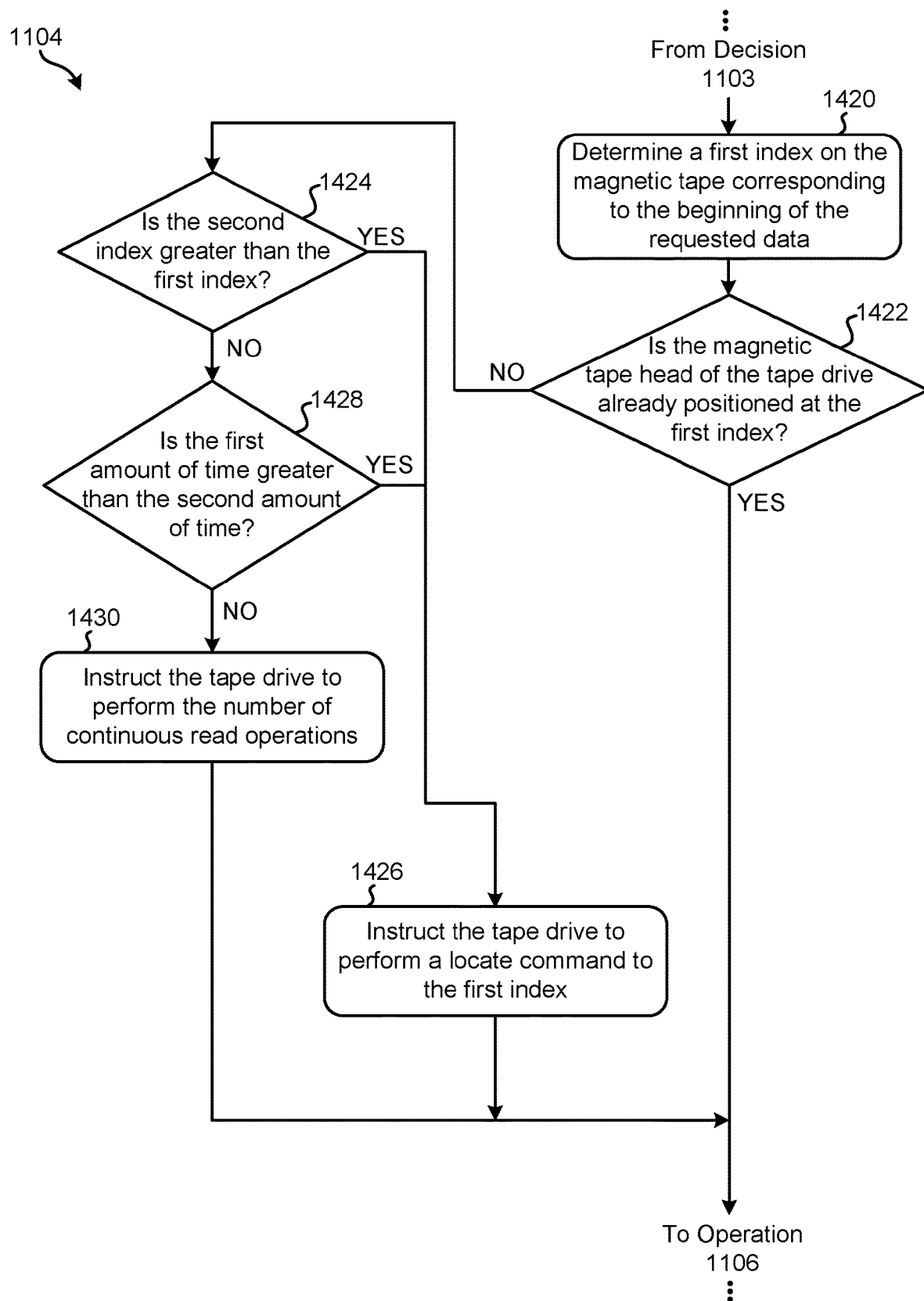
FIG. 14A is a flowchart of sub-processes for one of the operations in the flowchart of FIG. 11A according to one embodiment.

As previously described, additional processes may be performed in response to determining that the magnetic tape having the desired data is already loaded in a tape drive. According to an illustrative in-use example, which is in no way intended to limit the invention, FIG. 14A includes several processes which may be performed in order to minimize data access times by determining an efficient manner in which the magnetic tape is wound and/or unwound to arrive at the requested data. Specifically, FIG. 14A includes exemplary sub-processes of instructing the tape drive to access the beginning of the requested data on the magnetic tape according to one embodiment. One or more of the sub-processes included in FIG. 14A may be used to perform operation 1104 of FIG. 11A. However, it should be noted that the sub-processes of FIG. 14A are illustrated in accordance with one embodiment which is in no way intended to limit the invention.

As shown, sub-operation 1420 includes determining a first position on the magnetic tape corresponding to the beginning of the requested data. A "position" as used herein may be any form of information which designates a specific position on the magnetic tape itself. For example, a position may be a longitudinal position (LPOS) value corresponding to a servo band on the magnetic tape. According to some approaches, the first position may be determined by using an offset value and/or a size associated with the requested data. For example, the requested data may be a file or portion thereof that is stored in a given data track of a particular data band on the magnetic tape beginning at a certain offset from a reference point on the magnetic tape, and extending a certain distance along the length of the magnetic tape depending on the size of the file. The reference point may be a beginning of the tape, an end of a header region on the tape, the beginning of a given wrap number of the tape, an end of tape, etc. depending on the desired approach. Moreover, the offset value and/or a size associated with the requested data may be stored in a lookup table which may be referenced (accessed) in order to perform sub-operation 1420.

Decision 1422 includes determining whether the magnetic tape head of the tape drive is already positioned at the first position. In other words, decision 1422 includes determining whether the magnetic tape head is already positioned about over the first position. The flowchart proceeds directly to decision 1106 of FIG. 11A below in response to determining that the magnetic tape head of the tape drive is already positioned at the first position. However, in response to determining that the magnetic tape head of the tape drive is not already positioned at the first position, the flowchart of FIG. 14A proceeds to decision 1424. There, decision 1424 includes determining whether a second position on the magnetic tape corresponding to the current position of the magnetic tape head relative to the magnetic tape is greater than the first position. In other words, decision 1424 includes determining whether the current position of the magnetic tape head relative to the magnetic tape is farther from the beginning of the magnetic tape than the first position is from the beginning of the magnetic tape. According to an example, a value having a linear relationship to the distance a position is from the beginning of tape may be assigned to each of the positions. The farther a position is from the beginning of magnetic tape along the length of the magnetic tape, the higher the value assigned to the respective position. Thus, if the position value associated with the current position $P_C$ of the magnetic tape head relative to the magnetic tape is greater than the position value associated with the starting position $P_D$ of the requested data, it may be determined that the second position is farther from the beginning of tape than the first position is.

As shown, in response to determining that the second position is greater than the first position, the flowchart proceeds to sub-operation 1426, which includes instructing the tape drive to perform a locate command to the first position. It is desirable that a locate command is used to access the first position in this situation because it has been determined that the magnetic tape head has already passed the first position and therefore the tape must be rewound in order to access the first portion again. As will soon become apparent, an alternative way to access a particular position on the magnetic tape may include performing read operations to advance the tape in a direction towards the particular position. However, some tape drives are unilateral in that they can only perform read operations in one direction. Thus, it may be desirable to perform a locate operation rather than a read operation in order to access the first position when it has already been passed by the magnetic tape head. However, in other embodiments, the tape drive may have a bidirectional tape head which is able to perform read operations in both directions of tape travel (from supply reel to take-up reel, and from take-up reel to supply reel). It follows that according to some examples, which are in no way intended to limit the invention, decision 1424 may not be performed, and the flowchart may proceed directly to decision 1428 from decision 1422.

Referring still to sub-operation 1426 of FIG. 14A, a locate command may be performed by the tape drive by using a coarse and/or a fine actuator to wind tape back onto the supply reel in order to access a position on the magnetic tape closer to the beginning of tape than a currently accessed region of the magnetic tape. The tape drive may use the first position to perform the locate command. From sub-operation 1426, the flowchart proceeds directly to decision 1106 of FIG. 11A below.

Returning to decision 1424, the flowchart proceeds to decision 1428 in response to determining that the second position is not greater than (is less than) the first position. As described above, a value may be assigned to each position which corresponds to the respective position's distance from the beginning of tape. Accordingly, the flowchart may proceed to decision 1428 in response to determining that the second position is closer to the beginning of the tape than the first position. There, decision 1428 includes determining whether a "first amount of time" associated with performing a locate operation to advance the magnetic tape from the second position to the first position is less than a "second amount of time" associated with performing a number of continuous read operations to advance the magnetic tape from the second position to the first position. Depending on the distance between the first and second positions, the amount of time it takes to advance the magnetic tape such that the magnetic tape head is positioned about over the first position may vary depending on the process used to advance the magnetic tape. For instance, performing a locate command may advance the magnetic tape more efficiently when the first and second positions are separated by larger distances, while performing a number of continuous read operations may advance the magnetic tape more efficiently when the first and second positions are positioned more closely to each other.

However, the specifics as to which process is most efficient to advance the magnetic tape such that the magnetic tape head is able to access the first position may depend on the particular tape drive. As previously described, locate searches for the position of a target record are processed through firmware, even when the target record has already been stored in a buffer inside the tape drive. As a result, locate commands take a relatively longer time $t_l$ to process. Even after the locate command has been performed, the tape drive must perform a read operation immediately following. Moreover, reading right after a locate command involves a setting time for hardware in the firmware, and thus takes a relatively longer time $t_{r1}$ to perform as well. However, performing a number of continuous read operations is processed with hardware but not with firmware, and thus takes an extremely low amount of time $t_{r2}$ to perform. This is partly due to tape drives typically having characteristics highly optimized for continuous reading in the forward direction.

The actual amount of time it takes to process each of these different operations may vary depending on the type (e.g., generation), configuration, etc. of the given tape drive. Thus, a tape drive may be tested after it is produced in order to determine values associated with these different processing times. These values may further be stored in memory (e.g., a lookup table) of the tape drive for future reference.

Despite the relatively faster and slower performance times associated with performing a locate command versus a number of continuous read operations, these performance times are at least somewhat dependent on the amount of space separating the first and second positions on the magnetic tape. Equation 1 provides an exemplary way to determine whether the first amount of time associated with performing a locate operation to advance the magnetic tape from the second position to the first position is less than the second amount of time associated with performing a number of continuous read operations to advance the magnetic tape from the second position to the first position. Accordingly, Equation 1, or equivalently Equation 1.1 (above) may be used to perform decision 1428 in some approaches. Accordingly, whether or not performing a number of continuous read operations takes less time than performing a locate operation followed by a read operation depends on a distance between the starting position of the requested data (the first position) and the current position of the magnetic tape head relative to the magnetic tape (the second position).

It follows that in some approaches, rather than determining whether Equation 1 is true on the fly for specific values of $P_D$ and $P_C$ during use, Equation 1 may be used to determine a range of relative values for $P_D$ and $P_C$ which result in the logical statement being true for a given tape drive. In other words, because the locate command processing time $t_l$, the read after locate processing time $t_{r1}$, and the continuous read processing time $t_{r2}$ may all be known (or at least may be determined) for a given tape drive, a range of values for $(P_D-P_C+1)$ which result in Equation 1 being true may be determined. Moreover, a range of values for $P_D$ and $P_C$ which result in a value for $(P_D-P_C+1)$ that is in the determined range may also be extrapolated and stored in memory, e.g., such as a lookup table. Thus, in some approaches decision 1428 may be determined by accessing a lookup table to determine whether the distance along the longitudinal length of the magnetic tape separating the second position from the first position is in a predetermined range which result in Equation 1 being true. Similarly, a determination may be made based on a number of portions of data between the two positions. For instance, the determination may be made based on the number of read requests that would be performed assuming each read request performed corresponded to reading one portion (e.g., block) of data. However, decision 1428 may be determined using any process which would be apparent to one skilled in the art after reading the present description.

With continued reference to FIG. 14A, the flowchart proceeds to sub-operation 1426 in response to determining that the amount of time to perform a number of continuous read operations is greater than the amount of time to perform a locate operation followed by a read operation. As described above, sub-operation 1426 includes instructing the tape drive to perform a locate command to the first position according to any of the approaches described herein. Alternatively, the flowchart may proceed to sub-operation 1430 in response to determining that the amount of time to perform a number of continuous read operations is less than the amount of time to perform a locate operation followed by a read operation. As shown, sub-operation 1430 includes instructing the tape drive to perform the number of continuous read operations. According to some approaches, each read operation performed may correspond to reading a single portion of data. For example, each read operation performed may correspond to reading a single block of data stored on the magnetic tape.

Moreover, because the number of continuous read operations are being performed in order to advance the magnetic tape to a desired position, the data that is actually read from the tape while performing the number of continuous read operations is not desired. Thus, it is preferred that the data read during the number of continuous read operations is discarded (e.g., deleted) rather than being stored in memory, used to perform further processing, provided to a user, etc. Accordingly, sub-operation 1430 may further include instructing the tape drive to discard (e.g., delete) the data right after it is read. It should be noted that the data read during each of the number of continuous read operations may be stored in memory at least to some extent. For instance, the data read from a given portion of the magnetic tape may be added to a read buffer as it is read. However, it is preferred that the data is not stored or used in a manner other than to perform the read operations prior to being deleted, e.g., as would be appreciated by one skilled in the art after reading the present description. Thus, in some approaches, the data read during each of the number of continuous read operations is discarded prior to a subsequent one of the read operations being performed (e.g., before the data is used at all). From sub-operation 1430, the flowchart proceeds directly to decision 1106 of FIG. 11A, which may be performed according to any of the approaches described herein. According to another illustrative in-use embodiment, which is in no way intended to limit the invention, FIG. 14B includes exemplary sub-operations of performing the locate-read approach for a subsequent portion of the requested data, one or more of which may be used to perform operation 1108 of FIG. 11A above. However, it should be noted that the sub-operations of FIG. 14B are illustrated in accordance with one embodiment which is in no way intended to limit the invention.

Figure 14B:
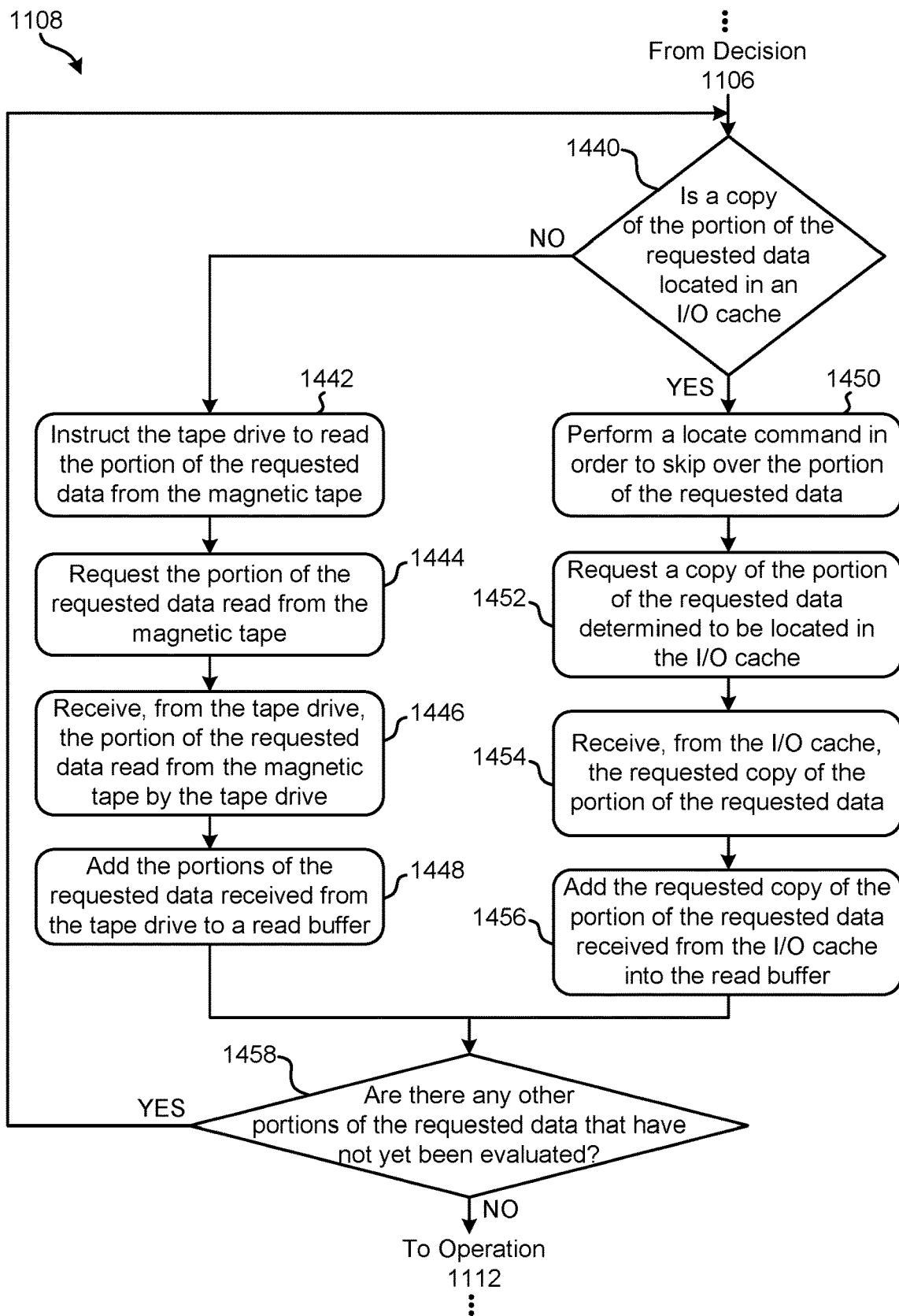
FIG. 14B is a flowchart of sub-processes for one of the operations in the flowchart of FIG. 11A according to one embodiment.

As shown, the flowchart of FIG. 14B includes decision 1440 which includes determining whether a copy of the portion of the requested data is located in an I/O cache. The flowchart proceeds to sub-operation 1442 in response to determining that a copy of the portion of the requested data is not located in an I/O cache. There, sub-operation 1442 includes instructing the tape drive to read the portion of the requested data from the magnetic tape. Moreover, sub-operation 1444 includes requesting the portion of the requested data read from the magnetic tape. In other words, sub-operation 1444 includes requesting the data read in operation 1442 from the tape drive. The tape drive may provide the data read via a wired electrical connection (e.g., see FIG. 10), a wireless connection (e.g., using an antenna), or any other desired manner of transferring information to the component performing the various processes described herein.

Sub-operation 1446 includes receiving, from the tape drive, the portion of the requested data read from the magnetic tape by the tape drive. Moreover, sub-operation 1448 includes adding the portions of the requested data received from (and read by) the tape drive to a read buffer.

Returning to decision 1440, the flowchart proceeds to sub-operation 1450 in response to determining that a copy of the portion of the requested data is located in an I/O cache. There, sub-operation 1450 includes performing a locate command in order to skip over the portion of the requested data. Moreover, sub-operation 1452 includes requesting a copy of the portion of the requested data determined to be located in the I/O cache, while sub-operation 1454 includes receiving, from the I/O cache, the requested copy of the portion of the requested data. Furthermore, sub-operation 1456 includes adding the requested copy of the portion of the requested data received from the I/O cache into the read buffer. The request sent to I/O cache for the copy of the portion of the requested data may be performed by a virtual tape system (VTS) in some approaches, e.g., as would be appreciated by one skilled in the art after reading the present description.

As shown, the flowchart of FIG. 14B progresses to decision 1458 from sub-operation 1456 as well as sub-operation 1448. Decision 1458 includes determining whether there are any other portions of the requested data that have not yet been evaluated (e.g., read). The flowchart returns to decision 1440 in response to determining that there is at least one portion of the requested data that has not yet been read, and any ones of the processes included in FIG. 14B may be repeated for the at least one portion. However, in response to determining that there are no more portions of the requested data left to evaluate, the flowchart returns directly to operation 1112 of FIG. 11A.

Figure 14C:
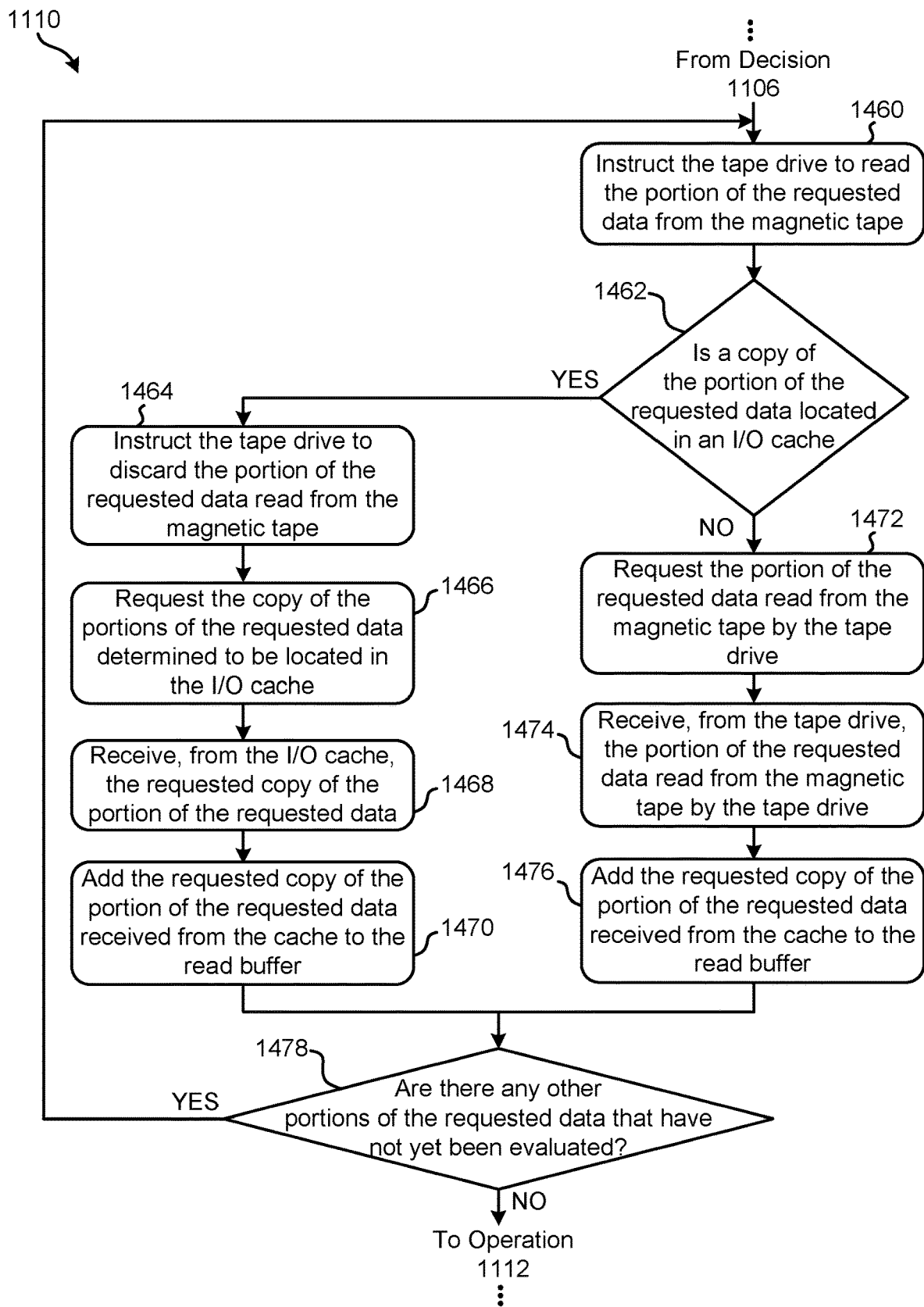
FIG. 14C is a flowchart of sub-processes for one of the operations in the flowchart of FIG. 11A according to one embodiment.

According to yet another illustrative in-use embodiment, which is in no way intended to limit the invention, FIG. 14C includes exemplary sub-operations of performing the continuous read approach for a subsequent portion of the requested data, one or more of which may be used to perform operation 1110 of FIG. 11A above. However, it should be noted that the sub-operations of FIG. 14C are illustrated in accordance with one embodiment which is in no way intended to limit the invention.

As shown, the flowchart of FIG. 14C includes instructing the tape drive to read the portion of the requested data from the magnetic tape. See sub-operation 1460. As previously mentioned, the continuous read approach includes reading each portion of the requested data regardless of whether a copy of the portion is also stored in cache. Thus, after the portion of the requested data has been read from the magnetic tape, the flowchart proceeds to decision 1462 which includes determining whether a copy of the portion of the requested data is located in an I/O cache. In response to determining that a copy of the portion of the requested data is located in an I/O cache, the flowchart proceeds to sub-operation 1464 which includes instructing the tape drive to discard (delete) the portion of the requested data read from the magnetic tape without otherwise using it.

This process of reading a portion of the requested data which is also located in the cache only to thereafter delete it may be considered an "imitation read" as a part of the continuous read approach. Again, in some situations it may take less time to read all the portions of the requested data from tape regardless of which portions will actually be serviced from cache as opposed to taking the time to skip over (perform locate operations) for each portion of the data actually serviced from cache, e.g., by a VTS. Thus, although an imitation read may include data being read from the magnetic tape and immediately deleted thereafter as a part of the continuous read approach, this may be more desirable in the sense that it will consume a lesser amount of time to complete than the alternative locate-read approach. However, it should be noted that the significant improvements achieved by various ones of the approaches described herein may not be as prevalent in systems having magnetic disk. As mentioned above, decrease in the speed of the reading due to performing a plurality of locate operations between performing read operations is negligible due to the data structure of the file system on disk as well as the physical structure of a physical disk system. Accordingly, it may not be desirable to implement some of these processes in an environment accessing particular data from a magnetic disk, e.g., as would be appreciated by one skilled in the art after reading the present description.

With continued reference to FIG. 14C, sub-operation 1466 includes requesting the copy of the portions of the requested data determined to be located in the I/O cache, while sub-operation 1468 includes receiving, from the I/O cache, the requested copy of the portion of the requested data. Moreover sub-operation 1470 includes adding the requested copy of the portion of the requested data received from the cache to the read buffer.

Returning to decision 1462, the flowchart may proceed to sub-operation 1472 in response to determining that a copy of the portion of the requested data is not located in an I/O cache. There, sub-operation 1472 includes requesting the portion of the requested data read from the magnetic tape by the tape drive. The data read by the tape drive may be provided in response to the request sent in sub-operation 1472 according to any of the approaches described and/or suggested herein. Accordingly, sub-operation 1474 further includes receiving, from the tape drive, the portion of the requested data read from the magnetic tape by the tape drive. Also, sub-operation 1476 includes adding the requested copy of the portion of the requested data received from the cache to the read buffer.

As shown, the flowchart of FIG. 14C progresses to decision 1478 from sub-operation 1476 as well as sub-operation 1470. Decision 1478 includes determining whether there are any other portions of the requested data that have not yet been evaluated (e.g., read). The flowchart returns to sub-operation 1460 in response to determining that there is at least one portion of the requested data that has not yet been read, and any ones of the processes included in FIG. 14C may be repeated for the at least one portion. However, in response to determining that there are no more portions of the requested data left to evaluate, the flowchart returns directly to operation 1112 of FIG. 11A.

As previously mentioned, it should be noted that various ones of the sub-processes included in FIGS. 14A-14C may be performed in a different order than that shown. For example, rather than determining whether a copy of a single portion of the requested data is located in an I/O cache after the portion is read (see decision 1462 of FIG. 14C), a determination may be made as to whether each of the number of portions of the requested data are located in the cache, e.g., such that a request for the portions determined to be located in the cache may be issued in parallel to reading the portions from the magnetic tape. According to another example, rather than adding each of the portions of the requested data to the read buffer individually, all or some of the portions of the requested data determined to be located in the cache may be received from the cache together (e.g., to reduce system throughput) and added to the read buffer together. In some approaches the portions of the requested data received from cache may be added to the read buffer together with the portions of the requested data read (and not discarded) from the magnetic tape.

It follows that various ones of the approaches described herein are able to overcome the performance degradation experienced in conventional products while performing a streamed read of a grouping of data using a tape drive, where some of the data is cached, e.g., at a kernel level of the system.

As described above, upon receiving a read request, a tape-based file system may calculate the difference between the current position of a magnetic head relative to the tape and the position of a record to be read, and determine a most advantageous method of arriving at the record. For instance, the system may select between a locate-read approach and a continuous read approach while discarding any returned data which will be accessed from cache. As a result, the file system may execute the read request by implementing the more desirable one of the approaches, thereby improving system performance based on current (e.g., specific) system parameters, decreasing read access times, reducing wear on a tape drive, etc. Thus, the introduction of using imitation read commands instead of locate commands in certain situations where doing so has an advantage over implementing a locate-read approach achieves significant improvements over the conventional shortcomings.

However, it should be noted that the improvements to system performance, data access times, read throughput, etc. may come at somewhat of a cost to other areas of performance. For instance, some operating systems may provide a command which controls the I/O cache. For example, a given operating system may provide a mechanism for discarding the I/O cache contents inside the kernel. However, when implemented, this mechanism also discards cache contents related to file systems other than the LTFS, which may degrade the reading performance of the other file systems although the performance of LTFS reading is improved. Thus, it may be desirable to weigh the benefits achieved by implementing various ones of the approaches described herein with the setbacks which may be experienced by other file systems in the same storage system, e.g., as would be appreciated by one skilled in the art after reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving a read request for data stored on a magnetic tape, the data comprising multiple portions;
for each of the portions of the requested data determined as not being located in a cache, determining whether performing a locate command or performing a read command a plurality of times will retrieve the portions of the requested data that are not located in the cache in a shorter amount of time;
issuing, to a tape drive, the command determined to retrieve the portions of the requested data that are not located in the cache in the shorter amount of time;
combining the portions of the requested data that are not located in the cache with portions of the requested data that are located in the cache; and
using the combined portions to satisfy the read request.

2. The computer-implemented method as recited in claim 1, comprising:
instructing the tape drive to access, on the magnetic tape, the portions of the requested data determined as not being located in the cache by:
determining whether the magnetic tape is already loaded in the tape drive,
issuing a request to move the magnetic tape to the tape drive in response to determining that the magnetic tape is not already loaded in the tape drive, and
instructing the tape drive to read an index at a beginning of a first partition on the magnetic tape.

3. The computer-implemented method as recited in claim 2, wherein determining whether the magnetic tape is already loaded in the tape drive includes:
identifying a tape cartridge in which the magnetic tape is stored.

4. The computer-implemented method as recited in claim 3, wherein issuing a request to move the magnetic tape to the tape drive in response to determining that the magnetic tape is not already loaded in the tape drive includes:

selecting the tape drive from one or more other tape drives; and instructing an automated robotic accessor to engage the tape cartridge and physically transport the tape cartridge from a current location to the tape drive.

5. The computer-implemented method as recited in claim 1, wherein the data is stored on the magnetic tape according to a linear tape file system format.

6. The computer-implemented method as recited in claim 1, wherein the cache is an input/output cache.

7. A system, comprising:

a processor; and logic integrated with the processor, executable by the processor, or integrated with and executable by the processor, the logic being configured to:

receive, by the processor, a read request for data stored on a magnetic tape, the data comprising multiple portions;

for each of the portions of the requested data determined as not being located in a cache, determine, by the processor, whether performing a locate command or performing a read command a plurality of times will retrieve the portions of the requested data that are not located in the cache in a shorter amount of time;

issue, by the processor to a tape drive, the command determined to retrieve the portions of the requested data that are not located in the cache in the shorter amount of time;

combine, by the processor, the portions of the requested data that are not located in the cache with portions of the requested data that are located in the cache; and use, by the processor, the combined portions to satisfy the read request.

8. The system as recited in claim 7, the logic being configured to:

instruct, by the processor, the tape drive to access, on the magnetic tape, the portions of the requested data determined as not being located in the cache by:

determining whether the magnetic tape is already loaded in the tape drive, issuing a request to move the magnetic tape to the tape drive in response to determining that the magnetic tape is not already loaded in the tape drive, and instructing the tape drive to read an index at a beginning of a first partition on the magnetic tape.

9. The system as recited in claim 8, wherein determining whether the magnetic tape is already loaded in the tape drive includes:

identifying a tape cartridge in which the magnetic tape is stored.

10. The system as recited in claim 9, wherein issuing a request to move the magnetic tape to the tape drive in response to determining that the magnetic tape is not already loaded in the tape drive includes:

selecting the tape drive from one or more other tape drives; and instructing an automated robotic accessor to engage the tape cartridge and physically transport the tape cartridge from a current location to the tape drive.

11. The system as recited in claim 7, wherein the data is stored on the magnetic tape according to a linear tape file system format.

12. The system as recited in claim 7, wherein the cache is an input/output cache.

13. A computer program product comprising a computer readable storage medium having program instructions embodied therewith, the program instructions readable and/or executable by a processor to cause the processor to:

receive, by the processor, a read request for data stored on a magnetic tape, the data comprising multiple portions;

for each of the portions of the requested data determined as not being located in a cache, determine, by the processor, whether performing a locate command or performing a read command a plurality of times will retrieve the portions of the requested data that are not located in the cache in a shorter amount of time;

issue, by the processor to a tape drive, the command determined to retrieve the portions of the requested data that are not located in the cache in the shorter amount of time;

combine, by the processor, the portions of the requested data that are not located in the cache with portions of the requested data that are located in the cache; and use, by the processor, the combined portions to satisfy the read request.

14. The computer program product as recited in claim 13, the program instructions readable and/or executable by the processor to cause the processor to:

instruct, by the processor, the tape drive to access, on the magnetic tape, the portions of the requested data determined as not being located in the cache by:

determining whether the magnetic tape is already loaded in the tape drive, issuing a request to move the magnetic tape to the tape drive in response to determining that the magnetic tape is not already loaded in the tape drive, and instructing the tape drive to read an index at a beginning of a first partition on the magnetic tape.

15. The computer program product as recited in claim 14, wherein determining whether the magnetic tape is already loaded in the tape drive includes:

identifying a tape cartridge in which the magnetic tape is stored.

16. The computer program product as recited in claim 15, wherein issuing a request to move the magnetic tape to the tape drive in response to determining that the magnetic tape is not already loaded in the tape drive includes:

selecting the tape drive from one or more other tape drives; and instructing an automated robotic accessor to engage the tape cartridge and physically transport the tape cartridge from a current location to the tape drive.

17. The computer program product as recited in claim 13, wherein the data is stored on the magnetic tape according to a linear tape file system format.

18. The computer program product as recited in claim 13, wherein the cache is an input/output cache.

* * * * *